United States Patent
Cochran et al.

(10) Patent No.: US 7,376,624 B2
(45) Date of Patent: May 20, 2008

(54) SECURE COMMUNICATION AND REAL-TIME WATERMARKING USING MUTATING IDENTIFIERS

(75) Inventors: William Cochran, Champaign, IL (US); Samuel M. Gustman, Santa Monica, CA (US); William R. Sellars, Milwaukee, WI (US)

(73) Assignee: Imagineer Software, Inc., Milwaukee, WI (US)

( * ) Notice: Subject to any disclaimer, the term of this patent is extended or adjusted under 35 U.S.C. 154(b) by 154 days.

(21) Appl. No.: 10/854,604

(22) Filed: May 26, 2004

(65) Prior Publication Data

US 2005/0010536 A1   Jan. 13, 2005

Related U.S. Application Data

(63) Continuation-in-part of application No. 10/248,894, filed on Feb. 27, 2003, now Pat. No. 6,996,544.

(60) Provisional application No. 60/360,023, filed on Feb. 27, 2002.

(51) Int. Cl.
*G06Q 99/00* (2006.01)
*H04K 1/00* (2006.01)
*H04L 9/00* (2006.01)

(52) U.S. Cl. ............. 705/53; 705/50; 705/57; 705/59

(58) Field of Classification Search ......... 705/50–52, 705/59, 53, 57
See application file for complete search history.

(56) References Cited

U.S. PATENT DOCUMENTS

| | | | |
|---|---|---|---|
| 4,182,933 A | 1/1980 | Rosenblum | |
| 4,568,914 A | 2/1986 | Gutleber | |
| 4,661,980 A | 4/1987 | Byram | |
| 4,731,840 A | 3/1988 | Mniszewski et al. | |
| 5,351,293 A | 9/1994 | Michener et al. | |
| H1586 H | 9/1996 | Fellows et al. | |
| 5,673,316 A * | 9/1997 | Auerbach et al. | 705/51 |
| 5,717,756 A | 2/1998 | Coleman | |
| 5,745,575 A | 4/1998 | Otto et al. | |

(Continued)

FOREIGN PATENT DOCUMENTS

GB    2371898 A  *  8/2002

(Continued)

OTHER PUBLICATIONS xCP: eXtensible Content Protection, IBM Research Division Almaden Research Center; pp. 1-5; 2003.

(Continued)

*Primary Examiner*—Calvin Loyd Hewitt II
(74) *Attorney, Agent, or Firm*—Michael Best & Friedrich, LLP

(57) ABSTRACT

A multiple party system for distributing content. In one embodiment, four parties are involved in the system: a consumer, a service provider, an authenticator, and a content provider. The distribution of content from the content provider to the consumer is carried out using a predefined protocol, mutating IDs, watermarks, and licenses. The authenticator controls the distribution of mutating IDs, verifies the identity of one or more participating parties, and provides tracking information for mapping service providers and consumers to particular, possibly watermarked, content items.

48 Claims, 17 Drawing Sheets

U.S. PATENT DOCUMENTS

| | | | |
|---|---|---|---|
| 5,751,805 A | 5/1998 | Otsuki et al. | |
| 5,802,294 A | 9/1998 | Ludwig et al. | |
| 5,847,677 A | 12/1998 | McCorkle | |
| 5,889,860 A | 3/1999 | Eller et al. | |
| 5,892,900 A * | 4/1999 | Ginter et al. | 726/26 |
| 5,910,987 A | 6/1999 | Ginter et al. | |
| 5,915,019 A | 6/1999 | Ginter et al. | |
| 5,915,021 A | 6/1999 | Herlin et al. | |
| 5,917,912 A | 6/1999 | Ginter et al. | |
| 5,920,630 A | 7/1999 | Wertheimer et al. | |
| 5,949,876 A | 9/1999 | Ginter et al. | |
| 5,982,891 A | 11/1999 | Ginter et al. | |
| 5,991,399 A | 11/1999 | Graunke et al. | |
| 5,999,285 A | 12/1999 | Brandt et al. | |
| 6,002,772 A | 12/1999 | Saito | |
| 6,014,688 A | 1/2000 | Venkatraman et al. | |
| 6,125,185 A | 9/2000 | Boesch | |
| 6,148,404 A | 11/2000 | Yatsukawa | |
| 6,178,505 B1 | 1/2001 | Schneider et al. | |
| 6,189,098 B1 | 2/2001 | Kaliski, Jr. | |
| 6,192,131 B1 | 2/2001 | Geer, Jr. et al. | |
| 6,229,750 B1 | 5/2001 | Correale, Jr. et al. | |
| 6,230,269 B1 | 5/2001 | Spies et al. | |
| 6,233,685 B1 | 5/2001 | Smith et al. | |
| 6,237,786 B1 | 5/2001 | Ginter et al. | |
| 6,240,185 B1 | 5/2001 | Van Wie et al. | |
| 6,253,193 B1 | 6/2001 | Ginter et al. | |
| 6,292,569 B1 | 9/2001 | Shear et al. | |
| 6,304,897 B1 | 10/2001 | Venkatraman et al. | |
| 6,330,670 B1 | 12/2001 | England et al. | |
| 6,363,488 B1 | 3/2002 | Ginter et al. | |
| 6,367,010 B1 | 4/2002 | Venkatram et al. | |
| 6,382,357 B1 | 5/2002 | Morrison et al. | |
| 6,389,402 B1 | 5/2002 | Ginter et al. | |
| 6,427,140 B1 | 7/2002 | Ginter et al. | |
| 6,477,647 B1 | 11/2002 | Venkatraman et al. | |
| 6,611,607 B1 * | 8/2003 | Davis et al. | 382/100 |
| 6,647,417 B1 | 11/2003 | Hunter et al. | |
| 6,702,181 B2 | 3/2004 | Ramachandran | |
| 6,801,999 B1 * | 10/2004 | Venkatesan et al. | 713/167 |
| 6,938,821 B2 | 9/2005 | Gangi | |
| 6,957,384 B2 | 10/2005 | Jeffery et al. | |
| 6,978,366 B1 | 12/2005 | Ignatchenko et al. | |
| 6,983,417 B2 | 1/2006 | Kagimasa et al. | |
| 6,996,544 B2 | 2/2006 | Sellars et al. | |
| 7,020,304 B2 * | 3/2006 | Alattar et al. | 382/100 |
| 2001/0026618 A1 | 10/2001 | Van Wie et al. | |
| 2001/0042043 A1 | 11/2001 | Shear et al. | |
| 2002/0023214 A1 | 2/2002 | Shear et al. | |
| 2002/0048369 A1 | 4/2002 | Ginter et al. | |
| 2002/0112171 A1 | 8/2002 | Ginter et al. | |
| 2002/0199108 A1 | 12/2002 | Chuang et al. | |
| 2003/0002673 A1 | 1/2003 | Van Wie et al. | |
| 2003/0005010 A1 | 1/2003 | Cleve et al. | |
| 2003/0023561 A1 | 1/2003 | Whaley et al. | |
| 2003/0023856 A1 | 1/2003 | Horne et al. | |
| 2004/0024670 A1 | 2/2004 | Valenzuela et al. | |
| 2005/0065876 A1 | 3/2005 | Kumar | |
| 2005/0109838 A1 | 5/2005 | Linlor | |
| 2005/0238149 A1 | 10/2005 | De Leon | |

FOREIGN PATENT DOCUMENTS

| | | |
|---|---|---|
| JP | 04196848 | 7/1992 |

OTHER PUBLICATIONS

Anand Natrajan; Authentication Based on Logical Time; Technical Report No. CS-97-23; pp. 1-7; May 10, 1996; ftp://ftp.cs.virginia.edu/pub/techreports/CS-97-23.ps.Z.

Wallich, Paul; Digital Hubbub; IEEE Spectrum; Jul. 2002; pp. 26-33.

Schneier, Bruce; Applied Cryptography Protocols, Algorithms, and Source Code in C, Second Edition; 1996; pp. 29 and 33; John Wiley & Sons, Inc.

Neuman, Clifford; Zorn, Glen; Trostle, Jonathan; and Hornstein, Ken; Internet Draft—Integrating Single-Use Authentication Mechanisms with Kerberos; Nov. 18, 1998; Updates: RFC 1510; 13 pages; obtained from http://www.globecom.net/ietf/draft-ietf-cat-kerberos-passwords-04.html on Sep. 26, 2003.

Caloyannides, Michael A.; Encryption wars: early battles; IEEE Spectrum; Apr. 2000; pp. 37-43, vol. 37, No. 4; IEEE, Inc., New York, NY.

Mel, H.X.; Baker, Doris; Chapter 8, Problems with Secret Key Exchange; Cryptography Decryped, First Printing Dec. 2000; pp. 65-73; Addison-Wesley USA.

Mel, H.X.; Baker, Doris; Part II Public Key Cryptography; Cryptography Decryped, First Printing Dec. 2000; p. 75; Addison Wesley USA.

Gottesman, Daniel; Lo, Hoi-Kwong; From Quantum Cheating to Quantum Security; Physics Today Online; Nov. 2000; pp. 1-11; from http://www.aip.org/pt/vol-53/iss-11/p22.html.

Taylor, Jim; Content Protection; DVD Demystified, Second Edition; Dec. 22, 2000; Chapter 4, pp. 190-204; McGraw-Hill, New York, NY.

Kolata, Gina; The Key Vanishes: Scientist Outlines Unbreakable Code; The New York Times on The Web; Feb. 20, 2001.

Cherry, Steven M.; Making Music Pay; IEEE Spectrum; Oct. 2001; pp. 41-46.

Nayar, Madhavan and Miller, Sharon; Anticipating Error Identifying Weak Links in the Electronic Healthcare Environment; Journal of AHIMA; pp. 46-49; Sep. 2004, vol. 75, Issue 8.

Hamilton, Win; Ensuring Information Integrity of the Membership Database; Forum; pp. 48-49; May 2005.

* cited by examiner

* IN THE REFERENCE IMPLEMENTATION n AND m ARE BOTH 256

THERE ARE AT LEAST TWO METHODS OF PACKAGING LICENSES. 1) FOR EACH PROVIDER, THE AUTHENTICATOR GENERATES A LIST OF LICENSE PAIRS.

THE LIST MAY BE DISTRIBUTED, FOR EXAMPLE, BY HAND, PUBLIC KEY ENCRYPTION, OR ENCODING WITH A LICENSE KEY FROM A PREVIOUSLY DISTRIBUTED LIST.

2) FOR EACH CONSUMER, A SINGLE MUTATING ID IS DISTRIBUTED.

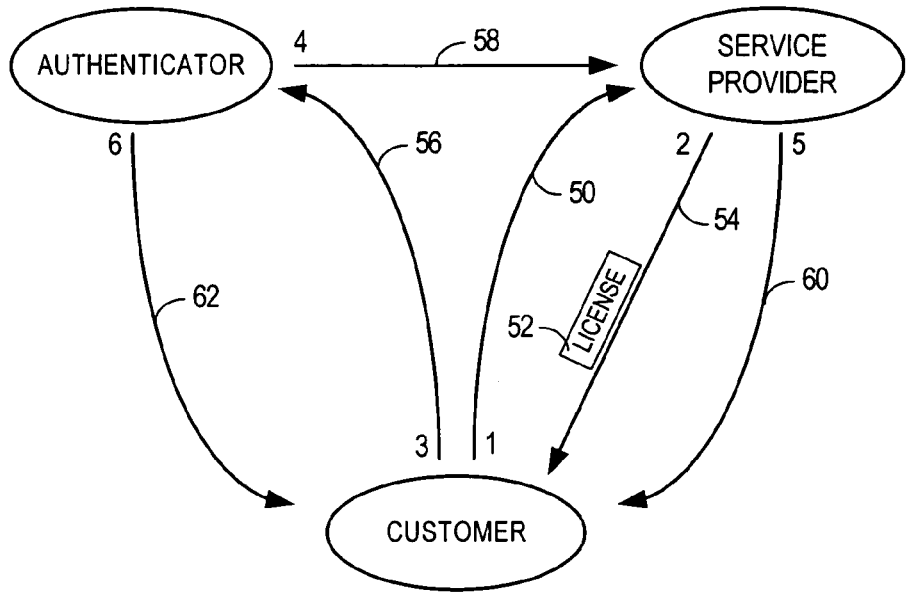

1 CUSTOMER MAKES A REQUEST FROM THE SERVICE PROVIDER TO VIEW SOME CONTENT.

2 THE SERVICE PROVIDER SENDS TO THE CUSTOMER AN ENCRYPTED LICENSE RECEIVED FROM THE CONTENT PROVIDER AND ENCRYPTED BY THE SERVICE PROVIDER.

3 THE CUSTOMER'S SET TOP BOX WILL ENCRYPT THE LICENSE WITH ITS OWN LICENSE AND SENDS IT TO THE AUTHENTICATOR.

4 THE AUTHENTICATOR CHECKS THE LICENSE FOR VALIDITY. IF VALID, THE AUTHENTICATOR TELLS THE SERVICE PROVIDER THAT THE CUSTOMER HAS AGREED TO PAY FOR THE CONTENT.

5 THE CONTENT PROVIDER THEN SENDS THE ENCRYPTED CONTENT TO THE CUSTOMER.

6 SIMULTANEOUSLY, THE AUTHENTICATOR SENDS DECODING INFORMATION.

FIG. 5

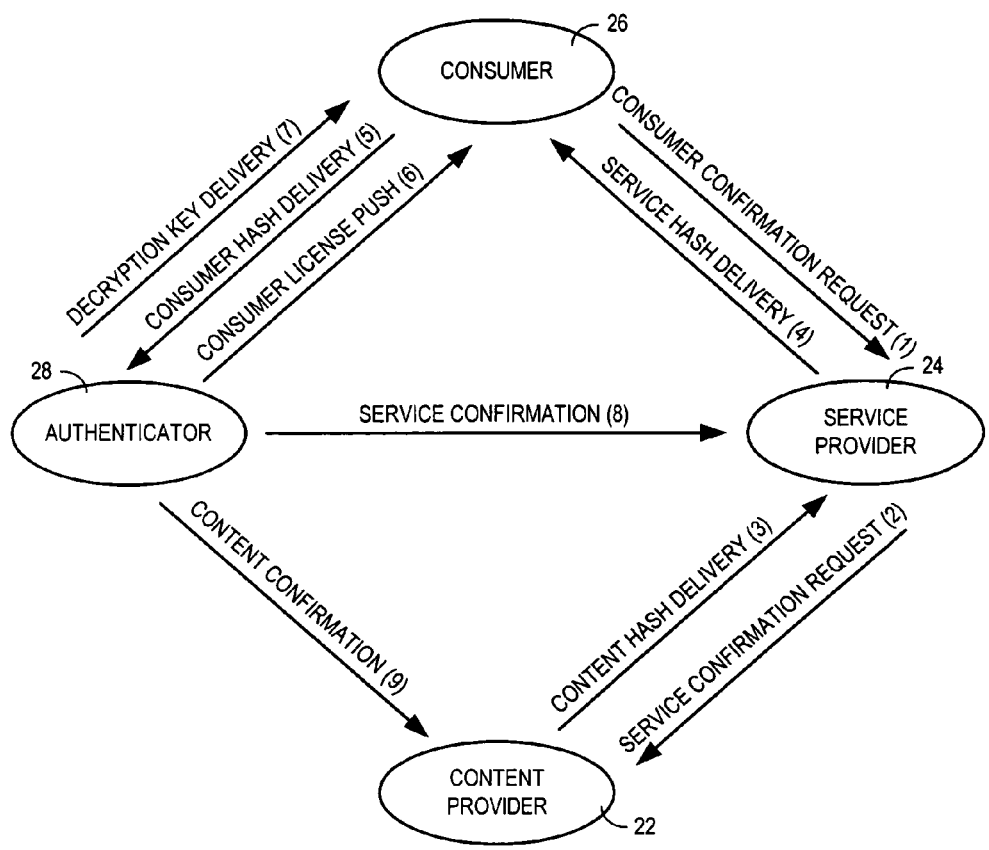

(1) CONSUMER MAKES A REQUEST FOR A MOVIE OR CONTENT.
(2) THE DISTRIBUTOR OR SERVICE PROVIDER RELAYS REQUEST TO THE PRODUCER OR CONTENT PROVIDER.
(3) THE PRODUCER ENCRYPTS A HASH OF THE MOVIE'S TITLE (OR SOME OTHER IDENTIFYING INFORMATION) USING ONE OF THE LICENSES ACQUIRED EARLIER.
SENDS:

── ENCRYPTED BY PRODUCER KEY ──

| PRODUCER LIC. # | IDENTIFYING INFORMATION FOR MOVIE |

(4) DISTRIBUTOR ENCRYPTS MESSAGE FROM PRODUCER WITH ONE OF ITS LICENSES ACQUIRED EARLIER.
SENDS:

── ENCRYPTED BY DISTRIBUTOR KEY ──
── ENCRYPTED BY PRODUCER KEY ──

| DISTRIBUTOR LIC. # | PRODUCER LIC. # | IDENTIFYING INFORMATION FOR MOVIE |

(5) CONSUMER ENCRYPTS MESSAGE FROM PRODUCER WITH HIS OWN LICENSE.
SENDS:

── ENCRYPTED BY CONSUMER KEY ──
── ENCRYPTED BY DISTRIBUTOR KEY ──
── ENCRYPTED BY PRODUCER KEY ──

| CONSUMER LIC. # | DISTRIBUTOR LIC. # | PRODUCER LIC. # | IDENTIFYING INFORMATION FOR MOVIE |

(6) NEW LICENSE IS SENT TO CONSUMER BY THE KEY MASTER OR AUTHENTICATOR.
(7) PRODUCER IS INFORMED OF THE USE OF HIS LICENSE IF HE SO DESIRES. ALTERNATIVELY, LICENSE USAGE MAY BE TRACKED BY THE KEY MASTER.
(8) DECRYPTION KEY FOR VIDEO OR CONTENT IS DELIVERED TO THE CONSUMER.
(9) DISTRIBUTOR IS INFORMED OF THE USE OF HIS LICENSE (E.G., FOR BILLING PURPOSES) AND IS TOLD TO BEGIN SENDING ENCRYPTED MOVIE DATA OR CONTENT.

*FIG. 6*

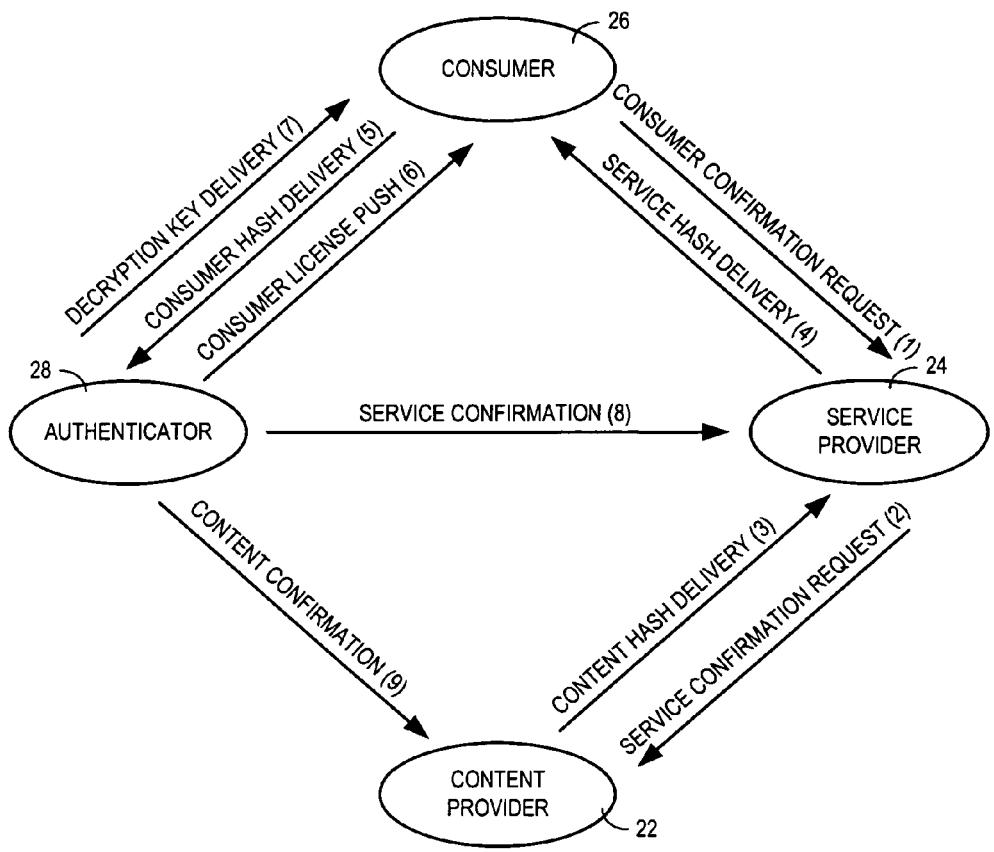

(1) CONSUMER MAKES A REQUEST FOR A MOVIE OR CONTENT.
(2) THE DISTRIBUTOR OR SERVICE PROVIDER RELAYS REQUEST TO THE PRODUCER OR CONTENT PROVIDER.
(3) THE PRODUCER ENCRYPTS A FUNCTION OF THE MOVIE'S TITLE (OR SOME OTHER IDENTIFYING INFORMATION) AND A FUNCTION OF A UNIQUE WATERMARK USING ONE OF THE LICENSES ACQUIRED EARLIER.
SENDS:

| | ENCRYPTED BY PRODUCER KEY | |
|---|---|---|
| PRODUCER LIC. # | IDENTIFYING MOVIE INFORMATION | WATERMARK |

(4) DISTRIBUTOR ENCRYPTS MESSAGE FROM PRODUCER WITH ONE OF ITS LICENSES ACQUIRED EARLIER.
SENDS:

| | ENCRYPTED BY DISTRIBUTOR KEY | | |
|---|---|---|---|
| | | ENCRYPTED BY PRODUCER KEY | |
| DISTRIBUTOR LIC. # | PRODUCER LIC. # | IDENTIFYING MOVIE INFORMATION | WATERMARK |

(5) CONSUMER ENCRYPTS MESSAGE FROM PRODUCER WITH HIS OWN LICENSE.
SENDS:

| | ENCRYPTED BY CONSUMER KEY | | | |
|---|---|---|---|---|
| | | ENCRYPTED BY DISTRIBUTOR KEY | | |
| | | | ENCRYPTED BY PRODUCER KEY | |
| CONSUMER LIC. # | DISTRIBUTOR LIC. # | PRODUCER LIC. # | IDENTIFYING MOVIE INFORMATION | WATERMARK |

(6) NEW LICENSE IS SENT TO CONSUMER BY THE KEY MASTER OR AUTHENTICATOR.
(7) PRODUCER IS INFORMED OF THE USE OF HIS LICENSE IF HE SO DESIRES, LINKING CUSTOMER TO WATERMARKED CONTENT ITEM. ALTERNATIVELY, LICENSE USAGE MAY BE TRACKED BY THE KEY MASTER.
(8) MATCHING DECRYPTION KEY FOR WATERMARKED VIDEO OR CONTENT IS DELIVERED TO THE CONSUMER.
(9) DISTRIBUTOR IS INFORMED OF THE USE OF HIS LICENSE (E.G., FOR BILLING PURPOSES) AND IS TOLD TO BEGIN SENDING MATCHING ENCRYPTED WATERMARKED MOVIE DATA OR CONTENT.

*FIG. 15*

SECURE COMMUNICATION AND REAL-TIME WATERMARKING USING MUTATING IDENTIFIERS

RELATED APPLICATIONS

This application is a continuation-in-part of application Ser. No. 10/248,894 filed on Feb. 27, 2003 now U.S. Pat. No. 6,996,544, which claims priority to provisional application no. 60/360,023 filed on Feb. 27, 2002.

BACKGROUND OF THE INVENTION

Embodiments of the invention relate to the distribution of content (such as text, audio, video, multi-media materials, and the like). More particularly, the invention relates to the distribution of such content in a manner that ensures that the copyrights and other similar legal rights of the content owner are respected.

More and more content is being delivered in digital form, and more and more digital content is being delivered over private and public networks, such as Intranets, the Internet, cable TV networks, and the like. For consumers of such content, digital versions (as opposed to analog, paper copy, and other forms) provide various advantages such as enhanced fidelity, improved and greater playback options, interactivity, and others. Online or network delivery generally offers greater convenience and timeliness. Online delivery is also cheaper than other delivery methods, and this benefits content publishers.

Most current and potential digitally distributed content is, like most books, distributed in a manner such that the publisher or owner generally gives or sells the content to a consumer, but continues to restrict rights to use the content even after the content is under the sole physical control of the consumer. For instance, a content owner typically retains copyright to the content so that the consumer cannot legally reproduce or publish the content without permission. Digital content, as opposed to older forms of media, allows a content owner to adjust pricing according to whether the consumer is allowed to make a persistent copy, or is just allowed to view the content as it is delivered.

Despite the worthwhile attributes of digital and network distribution, content owners are still generally reluctant to distribute content, particularly high-value content, via networks because unauthorized duplication, piracy, and distribution of digital content (e.g., as was done by users of Napster) is very easy. Unlike analog recorders, photocopiers, and other older devices, current technology permits unlimited, pristine copies of digital content to be made. And, in most instances, copies of the digital content can be made very quickly or nearly instantaneously. Furthermore, even current protective measures such as public key encryption and the content scrambling system ("CSS"), which is used for digital versatile discs, have been defeated.

Furthermore, once a key is gained or discovered, either legally or illegally, that unlocks the encrypted content, that piece of content is forever compromised. This free access to the content allows the possessor of the key to make and distribute endless copies of the decrypted content. In the event that a key is used to circulate illegal copies of a content item, it is generally impractical to track the illegally distributed content back to the individual who initially owned the key.

SUMMARY OF THE INVENTION

In light of the above, there is a need to provide a method and system of distributing content that ensures that the rights of content owners are respected. There is also a need to provide a mechanism that would track thieves and deter them from illegally distributing content.

The present invention provides among other things a multiple party system for distributing content. In one embodiment, three parties are involved in the system: a consumer, a content provider, and an authenticator. The distribution of content from the content provider to the consumer is carried out using a predefined protocol, mutating IDs, and licenses. The authenticator controls the distribution of mutating IDs and verifies the identity of both parties.

In another embodiment, four parties are involved in a multiple party system for distributing content. The system includes a consumer, a service provider, an authenticator, and a content provider. The distribution of content from the content provider to the consumer, through the services of the service provider, is carried out using a predefined protocol, mutating IDs, and licenses. The authenticator controls the distribution of mutating IDs and verifies the identity of one or more parties.

The invention also provides a method for distributing content. In one embodiment, the method for distributing content includes having a content provider make a request to send content to a consumer. The request includes an encrypted identifier for the content to be sent. In response to the request, the consumer encrypts the request to create an authentication request and sends the authentication request to an authenticator. The authenticator checks the authentication request and, if valid, informs the content provider to send the encrypted content identified in the initial request to the consumer. The authenticator sends a decryption key to the consumer so that the consumer may decrypt and view the content.

In another embodiment, the method includes having a consumer make a request for content to a service provider and relaying the request to a content provider. In response to the request, the content provider creates a license that includes identifying information concerning the service provider and encrypted information identifying the requested content. The license is sent to the service provider. The service provider encrypts the license from the content provider and sends this message to the consumer. The consumer encrypts the message to create an authentication request and sends the authentication request to an authenticator. The authenticator checks the authentication request and, if valid, informs the content provider to send encrypted content specified in the license to the consumer. The authenticator sends a decryption key to the consumer so that the consumer may decrypt and consume the content.

The invention further provides a method for distributing content where each copy of the content is uniquely watermarked. The method includes having a consumer make a request for content to a service provider and relaying the request to a content provider. In response to the request, the content provider creates a license that includes identifying information concerning the service provider and encrypted information identifying the requested content and a unique watermark. The license is sent to the service provider. The service provider encrypts the license from the service provider and sends this message to the consumer. The consumer encrypts the message to create an authentication request and sends the authentication request to an authenticator. The authenticator checks the authentication request and, if valid, informs the content provider to send encrypted content, watermarked with the watermark specified in the received license, to the consumer. The authenticator sends a decryption key to the consumer so that the consumer may decrypt and view the watermarked content.

In another embodiment, the invention provides a content distribution system that includes an authenticator and a content provider and a consumer. The content provider has content and a content identifier, and generates a first mutating identifier associated with the content identifier. The system also includes a consumer device that is operable to receive requests to send content and content from the content provider. The consumer device receives the first mutating identifier from the content provider in the form of a request, generates a second mutating identifier associated with the first mutating identifier, and distributes the second mutating identifier to the authenticator. The authenticator validates the request and thereafter informs the consumer of validity of the request. If the request is valid, the content provider thereafter encrypts the content and sends the encrypted content to the consumer while the authenticator sends a decryption code to the consumer.

In another embodiment, the invention provides a content distribution system that includes an authenticator and a content provider. The content provider has content and a content identifier, and generates a first mutating identifier associated with the content identifier. The system also includes a consumer device that is operable to generate a request for the content. In addition, the system includes a service provider. The service provider receives the request from the consumer device, receives the first mutating identifier from the content provider, generates a second mutating identifier associated with the first mutating identifier, and distributes the second mutating identifier to the consumer device. The consumer device generates a third mutating identifier associated with the second mutating identifier, and distributes the third mutating identifier to the authenticator. The authenticator validates the request and thereafter informs the service provider of the validity of the request. If the request is valid, the content provider thereafter encrypts the content and sends the encrypted content to the consumer while the authenticator sends a decryption code to the consumer.

As is apparent from the above, it is an advantage of the present invention to provide a method and system of distributing content with the ability to track a consumer, or even one of several service providers, to a particular content copy. Other features and advantages of the present invention will become apparent by consideration of the detailed description and accompanying drawings.

BRIEF DESCRIPTION OF THE DRAWINGS

In the drawings:

FIG. 5 is a schematic illustration of a portion of the system shown in FIG. 1.

FIG. 6 is a schematic illustration of a communication protocol used in the system shown in FIG. 1.

FIG. 15 is a schematic illustration of a communication protocol used in the system shown in FIG. 1 with the addition of watermarking the content.

DETAILED DESCRIPTION

Figure 1:
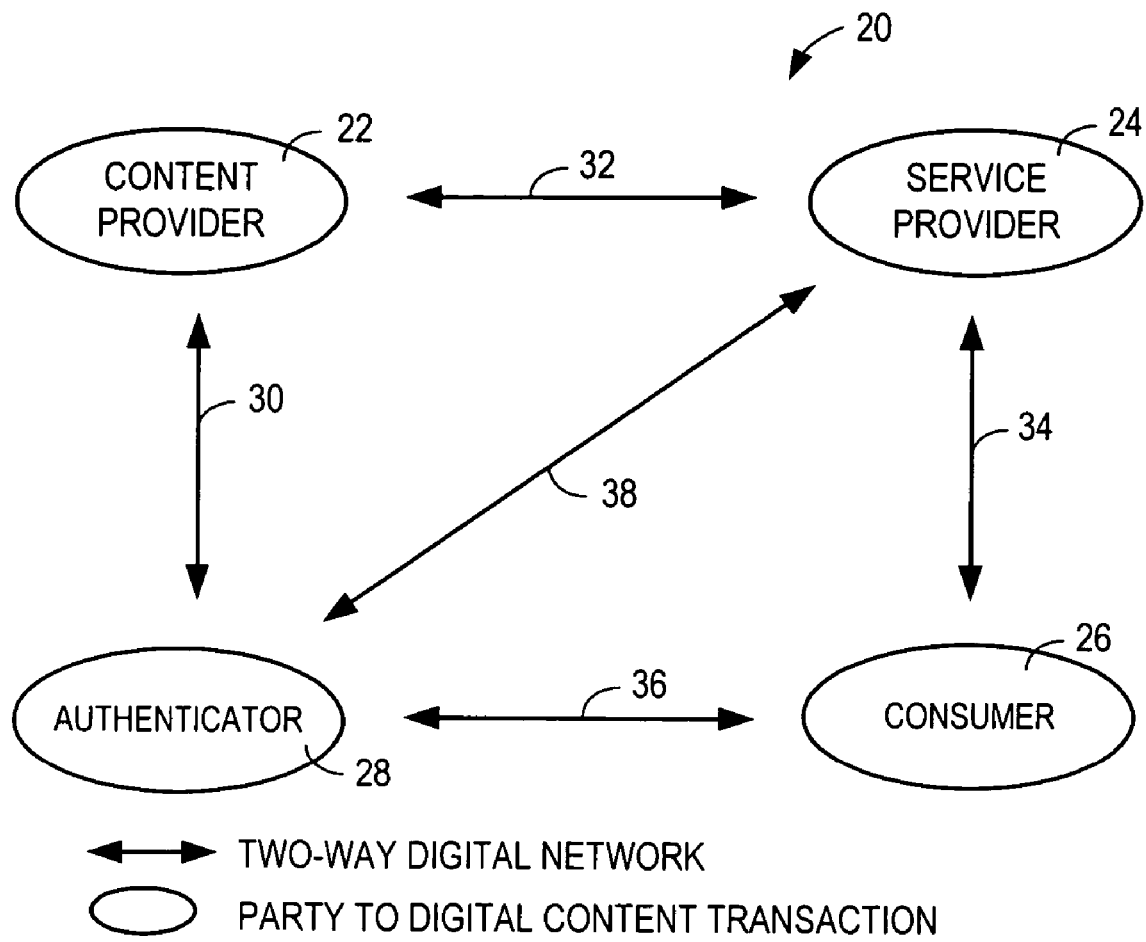
FIG. 1 is a schematic illustration of a system of one exemplary embodiment of the invention where four entities are involved in communication.

Before embodiments of the invention are explained in detail, it is to be understood that the invention is not limited in its application to the details of the construction and the arrangements of the components set forth in the following description or illustrated in the drawings. The invention is capable of still other embodiments and of being practiced or being carried out in various ways. Also, it is to be understood that the phraseology and terminology used herein is for the purpose of description and should not be regarded as limiting.

In particular it should be understood that the invention is implemented using various computer devices, such as personal or home computers, servers, and other devices that have processors or that are capable of executing programs or sets of instructions, including special purpose devices such as set top boxes. In general, the invention may be implemented using existing hardware or hardware that could be readily created by those of ordinary skill in the art. Thus, the architecture of exemplary devices will not be explained in detail, except to note that the devices will generally have a processor, memory (of some kind), and input and output devices. In some cases, the devices may also have operating systems and application programs that are managed by the operating systems. The hardware devices will also generally need some ability, depending on the role of the device in the particular embodiment of the invention implemented, to compress or decompress data and to encode data or decode encrypted data. In many instances, a decompression capability may be provided using available codecs, such as hardware-implemented MPEG codecs. A decryption capability may be provided using a decryption hardware or software module capable of decrypting data that is encrypted using the encryption algorithm chosen. One encryption algorithm that is suitable for use in embodiments of the invention is the Rijndael algorithm, an example of which is available at http://www.esat.kuleuven.ac.be/~rijmen/rijndael/rijndaelref.zip.

FIG. 1 illustrates an exemplary system 20 configured to distribute content over a network. In reality, one or more networks or communication systems such as the Internet, the telephone system, wireless networks, satellite networks, cable TV networks, and various other private and public networks could be used in various combinations to provide the communication links desired or needed to create embodiments or implementations of the invention, as would be apparent to one of ordinary skill in the art. Thus, the invention is not limited to any specific network or combinations of networks. However, it is preferred that the networks or communication system used have the ability to support secure communications such as communications with data encrypted with a version of Rijndael encryption, secured socket layer ("SSL") communications, or others. Furthermore, data can be transferred from one party to another with wire, digital satellite service ("DSS"), or physical media being physically carried from one party to another.

In the embodiment shown in FIG. 1, the system 20 includes four participants: a content owner or provider 22, a service provider 24, such as a cable company, Internet service provider, or the like, a consumer 26, and an authenticator 28. Although, only one content provider, service provider, and consumer are shown, in most implementations of the invention numerous content providers, service providers, and consumers will be involved. Further, there could even be multiple authenticators, although only one is required. In practice, it is likely that the following relationship will exist: number of authenticators<number of content providers<number of service providers<number of consumers, but again there is no limit on the number of participants or any requirement of a particular relationship between the numbers of the various types of participants.

Figure 2:
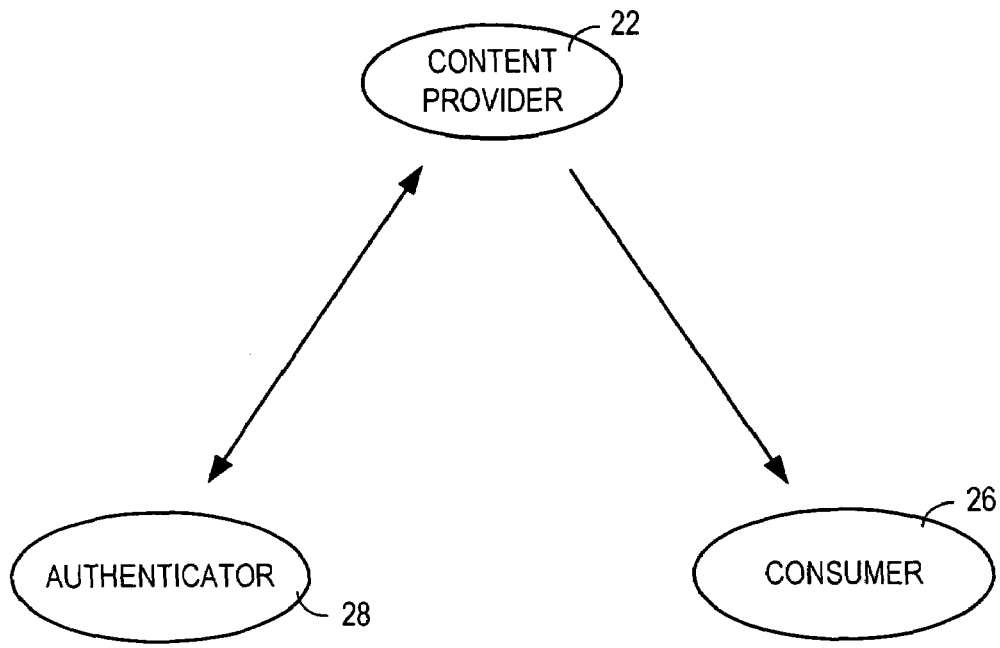
FIG. 2 is a schematic illustration of a system of another exemplary embodiment of the invention where three entities are involved in communication.

In another embodiment shown in FIG. 2, the system 20 includes three participants: the content owner or provider 22, the consumer 26, and the authenticator 28. Although, only one content provider and consumer are shown, in most implementations of the invention numerous content providers and consumers will be involved. Further, as mentioned before, there could be more than one authenticator, although only one is required. Again there is no limit on the number of participants or any requirement of a particular relationship between the numbers of the various types of participants.

The participants 22, 24, 26, and 28 are connected to each other via two-way links 30, 32, 34, 36, and 38. These links may be a constructed from all or part of the networks mentioned above. The system 20 uses a key-based encryption algorithm and currently available algorithms such as the Rijndael algorithm may be used. The ultimate choice for the algorithms used will depend on a variety of factors including a trade off between the strength of the algorithm (in terms of being broken) and speed (in terms of a processor's capability to perform the mathematical operations required by the chosen algorithm).

In one embodiment of the invention, it is assumed that the consumer has a decoding processor or similar device, which may, for example, take the form of a "set top box," home computer, or other device. In this same embodiment, it is assumed that the decoding processor is in a "hostile environment," in the sense that consumer may possibly want to tamper or otherwise circumvent rights management features of the decoding processor. Thus, it is preferred that the decoding processor be housed in a container that has the ability to detect intrusions to its interior. It is also preferable, that the decoding processor have "persistent" memory such as non-volatile RAM, EPROM, or other storage where data remains intact after the removal of power. The persistent memory is used to store identification information, which may be a "mutating ID," that, preferably, changes over time.

In preferred embodiments, the system 20 uses a random number generator to generate certain numbers used by a protocol implemented or followed by the system. It is preferred that the random number generator produce numbers that are as truly random as is possible with the particular technology used to implement the invention. In one embodiment, communication traffic, such as requests from customers to obtain content, is used to create random numbers. Such requests occur, in general, in an unpredictable manner. Thus, the random numbers generated based on such traffic are also truly or nearly truly random, as opposed to pseudo random numbers generated with algorithmic methods.

In the exemplary embodiment shown, each of the parties 22-28 in the system 20 has different responsibilities and it is assumed that each party trusts the authenticator 28. Further, it is preferable that content provider 22, service provider 24, and consumer 26 be assigned a changing or mutating identifier ("ID"), which is explained further below.

Content Provider ("Alice")

The content provider 22 is an entity such as a movie studio, recording company, or any other entity that wishes to distribute content electronically. In general, it is assumed that the content provider 22 owns the copyright or other intellectual property rights in the content or is authorized by the owner of such rights to distribute the content. It is assumed that the content provider 22 wants to be reimbursed fairly for each copy of its content distributed using the system 20. It is also assumed that the content provider 22 wants to track each provided copy of its content to both the service provider 24 and consumer 26 to which it is allocated. Thus, in one embodiment of the invention, the system 20 is configured such that the content provider 22 can produce a virtual inventory of licenses for content using a list of mutating IDs (generally created as needed), where each license gives authorization to view or in some cases maintain a copy of the content provided. The virtual inventory (or set of licenses) may be assigned to various distribution entities, such as one or more service providers. As the virtual inventory is consumed, the consumption is tracked in order to record, log, or note which service provider 24 provided content copy to one of its consumers. For instance, tracking of the virtual memory allows a content provider such as a movie studio, which has sold distribution rights to a cable company and a satellite broadcasting company, to determine which of the entities, the cable company or the satellite broadcasting company, distributed the content to the subject consumer. In preferred embodiments, the content provider 22 is the sole encrypter of its content and controls the decoding of the content by, for example, denying a request, as explained further below.

In another embodiment of the invention, the system 20 is configured such that the content provider 22 can produce a list of watermarks, apply a unique watermark to each copy of its content, and produce a virtual inventory of licenses for watermarked content using a list of mutating IDs (generally created as needed), where each license gives authorization to view or in some cases maintain a copy of the watermarked content provided. The virtual inventory (or set of licenses) may be assigned to various distribution entities, such as one or more service providers. As the virtual inventory is consumed, the consumption is tracked in order to record, log, or note which service provider 24 provided content copy to one of its consumers and, furthermore, which consumer received a particular watermarked piece of content. For instance, tracking of the virtual memory allows a content provider such as a movie studio, which has sold distribution rights to a cable company and a satellite broadcasting company, to determine which of the entities, the cable company or the satellite broadcasting company, distributed the content to the subject consumer. The tracking system also allows the consumption activity of individual consumers to be recorded or logged since a watermarked content can be mapped to a specific consumer.

Service Provider ("Bob")

In the embodiment shown, the service provider 24 distributes content of the content providers. However, service providers may also have several additional responsibilities, including identification of themselves and the subject content with mutating IDs. In the embodiments described, a user such as the consumer 26 without the appropriate mutating IDs cannot decode content. In many scenarios, the service provider 24 provides the requested content off of or from a storage device that is local to the service provider 24. However, the invention is not limited to any particular location of the content and content may be retrieved from storage of the content provider 22 and then transferred to the consumer 26. In preferred embodiments of the invention, every service provider 24 sees each request from consumers in the system 20 and receives authentication from the authenticator 28. In some embodiments, any one of the service providers in a particular embodiment may be responsible for shipping or transferring the content to the consumer. This allows content providers to avoid having to deliver their content to service providers, if they so desire. In other words, the service provider 24 need not possess (such as by maintaining encrypted copies in local storage) the content that is ordered by consumers.

Consumer ("Carol")

It is assumed that at least some consumers may wish or attempt to view content without paying for it. Therefore, measures are provided to prevent unauthorized viewing of content. The mutating IDs mentioned above provide one mechanism by which content decoding and, therefore, viewing is controlled. By encapsulating multiple mutating IDs, the set top box is able to prove to the authenticator 28 that 1) the set top box is a licensed decoder of the content, 2) the service provider 24 is a licensed distributor of the content, and 3) the content itself was licensed for use by the content provider 22 for the consumer, as will be explained in greater detail.

Authenticator ("Trent")

The authenticator 28 is the repository that holds the data necessary to decode a particular piece of content, or watermarked content if applicable. In the embodiments discussed, the authenticator 28 verifies the consumer 26, the service provider 24, and the content by their mutating IDs before sending any decoding information to the subject consumer 26. The authenticator 28 is also the source of mutating IDs and keeps track of such IDs using a database or similar mechanism.

Mutating ID

Figure 3A:
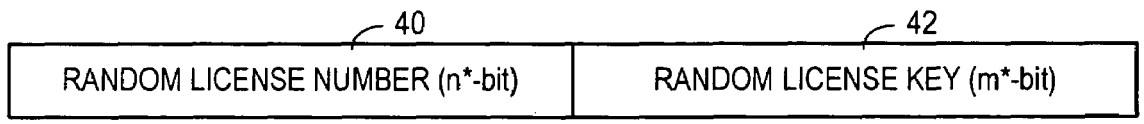
FIG. 3A is an illustration of a bit stream (called a "mutating ID") used in one embodiment of the invention.

An exemplary mutating ID 38 is shown in FIG. 3a. The mutating ID 38 is an identifier having two portions: a first portion 40 and a second portion 42. The first portion 40 is an identifying number, which is a random number. The second portion 42 is an encoding/decoding key, also a random number and preferably a symmetric cipher key. As implemented in the embodiments discussed herein, a mutating ID can be used only once and then can not be used again. Mutating IDs are generated and tracked by the authenticator 28. Because the mutating IDs are one-time-use mechanisms, once a service provider or consumer or other entity has used its supply of mutating IDs, additional mutating IDs must be obtained from the authenticator 28. The data in a mutating ID is chosen at random with an equal probability of all possible mutating IDs. Once a request or decode for specific content has been made, the three mutating IDs (consumer, service provider, content) are discarded and new mutating IDs are generated for additional transactions, in a manner described in more detail below. Information regarding how mutating IDs are distributed to parties in the system 20 is also provided in FIGS. 3b and 3c. Specifically, entities of the system can receive either numerous mutating IDs or a single mutating ID depending on the desired use. In one embodiment of the invention, a provider 43, who may perform functions of both the content provider and the service provider, may request multiple number/key pairs from the authenticator. Each provider 43 requires numerous number/key pairs since each copy of a content item must have a unique license made from a unique number/key pair. The authenticator creates as many mutating IDs as the provider 43 requires and sends a list of pairs 26 back to the provider 43. The provider 43, knowing the quantity of number/key pairs requested and the size of each pair, breaks the list into individual number/key pairs. In other embodiments of the invention, each entity of the content distribution system needs a mutating ID to identify itself to the authenticator, and after using a mutating ID an entity requires a new mutating ID from the authenticator. A single, new mutating ID is sent to the entity, which replaces the entity's previous mutating ID.

As should be apparent, embodiments of the invention are symmetric key systems. Symmetric key systems commonly encounter key management issues as the number of entities of the system grows. For example, a network of n entities requires $n(n-1)/2$ keys to enable all entities to communicate with one another. Thus, for a system of 1000 entities, where every entity wishes to send identical content to every other entity, almost a half million keys are required.

Disclosed embodiments, however, do not require a separate key for every pair of entities of the system. As will be illustrated, each entity and content distributed receives one key, which is mutated after each use. For a system of 1000 entities, only 2000 keys are required compared to the almost half of a million keys with previous symmetric key systems. Also, the authenticator is not required to store the entire bit string of the mutating ID. The authenticator may use a hash function or simply a positional index to map each key partition of the mutating ID into a memory storage location based on the corresponding number.

Other differences between embodiments of the invention and prior security systems relate to speed and reduced vulnerability to certain attacks. The use of symmetric keys also allows fast computation (as compared to public key systems) and reduces the effectiveness of chosen plaintext attacks. Embodiments of the invention are relatively fast because of they use symmetric keys rather than public keys.

The fundamental concept behind public key systems is the use one-way functions. One-way functions are easy to compute but hard to reverse. Public key systems use trapdoor one-way functions that provide a key to compute the one-way function in the opposite direction. Public key systems provide public keys for each participant that are freely accessed and used as a one-way function to apply to a message. Public key systems also provide private keys (which are underiveable, at least as originally thought, from the public key) to each individual participant to compute the message given the calculation of the one-way function. The security of public key systems relies on the fact that the private key cannot be derived from the public key. In order to maintain this requirement, the one-way functions used in public key systems are complex. The added complexity, however, comes at the cost of added computation time. Public key systems are often 1000 times slower than symmetric key systems.

Regarding reduced vulnerability to attacks, a chosen-plaintext attack occurs when an intruder has access to an encryption key or process, chooses specific plaintext to encrypt, and attempts to gain knowledge from the encrypted text. In public-key systems an individual's public key is known to all participants in a communication system. Any intruder can encrypt an endless number of messages using an individual's public key. If an attacker encrypts possible messages with an individual's public key and then intercepts an encrypted message sent to the individual, the intruder can compare the intercepted message with messages he or she has created. If an interception message matches an encrypted message created by the intruder, the message has been compromised and the intruder can now read a message that was not intended for him or her. This attack is easy and effective if a small number of possible messages exist, but even if the number of possible messages is more than the intruder is able to encrypt or compare with intercepted encrypted messages, just knowing that an intercepted encrypted message does not correspond to a particular message can provide useful information to the intruder. In either situation, the intruder will not be able to deduce the private key of the individual but he or she may be able to deduce the message, or information regarding the message, sent to the individual. Since the embodiments of the invention utilize a symmetric key system, chosen-plaintext attacks are not applicable because encryption keys are not public knowledge.

There is another problem with prior symmetric key systems and public key systems. Once an unauthorized entity gains access to an authorized key, the unauthorized entity can decode all messages encrypted with the compromised key, and, perhaps more dangerous, can encrypt false messages to deceive other entities of the system. The mutating ID protocol reduces this weakness by mutating each symmetric key after it has been used. Even if a key is compromised, the compromised key cannot be used to generate future messages nor be used to decrypt future message since it is marked by the authenticator as used and is never used again to encrypt messages.

Protocol

The system 20 uses a protocol to govern communications between entities. Each entity is randomly assigned a one-time use number/key pair, or mutating ID, (such as the identifier or ID 38 shown in FIG. 3A) that is to be tagged onto a previously mutated ID by the authenticator 28. As noted, each mutating ID includes a random number 40 and a random corresponding coding key 42. The one-time-use number/key pair may take the form of a modified hash. In addition to being random, the one-time-use number/key pair or the hash is immediately discarded after each decryption. In other words, the protocol generates a new random number that has never been used when a hash or a one-time-use number/key is needed. In addition to identifying the entity participating in the content distribution system, the one-time-use number/key is also a completely unrelated hash from the entity using it. That is, the hash does not contain any information concerning the identity of the entity. In this way, the identities of the entities are blind to all participants except for the authenticator 28.

The authenticator 28 also generates encryption keys for the content distributed over the system 20. Any entity wishing to distribute content requests a key. The entity sending the content supplies the authenticator with a function, or any identifying string, of the content to distribute and the authenticator responds with an associated key. The key, like the mutating IDs, is unrelated to the content that it encrypts. The authenticator also has no knowledge of the true content since only a function of the content or a random identifier is provided. The authenticator records the key and the associated function, or identifying string, of the content. The authenticator supplies the key to any authorized entity of the system 20 that makes a legitimate request. A request for the associated key to a content item includes a reference to the function, or identifying string, of the content item. The authenticator 28 looks up the matching key to the function, or identifying string, indicated in the request and returns the found key.

The preferred embodiments of the system 20 are implemented with an encryption algorithm and a random number generator. Preferably, the encryption algorithm is a symmetric key-based encryption algorithm. The keys are permutation identifications, offsets, and skips. All three could be bundled into one object called a "key." Therefore, any key based encryption algorithm can be used in embodiments of the invention. Since introducing a new encryption algorithm can be a very time consuming process, the system 20 was created to allow already existing and tested key-based encryption algorithms to be used.

With respect to generating a random number, in the embodiment shown, three different procedures are used. Of course, other combinations of random number procedures can also be used to generate a random number. The first random number generation procedure is a standard congruential random number. The second random number generation procedure generates a random number that is used to determine a sampling rate of a random stream.

Acquiring a random stream can be difficult. By conventional definition, a random stream or a set of numbers is considered random if and only if the set is the most compact way to represent the numbers. For instance, given the set 2, 4, 6, 8, 10, $\oplus$, a more compact representation would be $\{2i | i \in Z+\}$ or any even number in the positive integer number set. Another way to state this is a set of numbers for which there is no discernable "pattern." The goal of encrypted communication is to remove all patterns from the encrypted data being transmitted so that intelligent guessing cannot be used to decrypt the encrypted transmitted data. In embodiments of the system 20, the authenticator 28 provides all the random numbers used in the distribution and transmission of content. As discussed in more detail, the sequence of generated numbers is a sequence of random numbers or a random stream, or at least a close approximation to a random stream.

The third process of the random number generator is to ensure that there is no deterministic way to retrieve the next number. The random streams coming into and leaving the authenticator 28 are encrypted and thereby contain encrypted data. This non-deterministic mechanism used to generate the random stream helps ensure that the random number sequence cannot be represented by a more compact expression, hence defining a random stream.

For example, the authenticator 28 is designed to receive requests to decode various content. These requests reach the authenticator 28 in a random order. For instance, suppose consumer X requests the key to movie Y, and consumer W requests the key to song Z, etc. These requests are formalized by the protocol as sequences of numbers that have been arbitrarily chosen either to be intentionally arbitrary or encrypted by an arbitrary key. Since the requests are arbitrary in nature and are processed in an arbitrary fashion, a stream of random numbers is naturally generated. By sampling this stream in a semi-arbitrary way (i.e., congruential random number), a good sequence of random numbers is generated.

In one embodiment, the protocol used in the system 20 combines a packet assembly disassembly generator or PAD, key pairing, and a RC4 random stream cipher. More specifically, to encrypt the information in a window of data, a PAD series is generated once a PAD generator is chosen. A second random stream P is generated based on the PAD series in the following manner:

$$p_k = \text{pad}_{(k_j) \bmod n} \otimes \text{pad}_{(k_{i+1}) \bmod n} \otimes \ldots \otimes \text{pad}_{(k_{i+j}) \bmod n}$$

where $p_k$ is the k-th element of the P series, and $\text{pad}_{(kj) \bmod n}$ is the j-th element of the PAD series. That is, every element of the P series is a combination of exclusive-ORing of the elements in the series generated by the PAD generator. The key pair generally includes a public key and private key. These keys do not have any mathematical relation. They are generated randomly and independently of each other. The keys themselves are simply twenty or more digit numbers. Each entity has a unique key pair.

An exemplary embodiment of the protocol will now be discussed in greater detail. In the embodiment shown in FIG. 1, the content provider 22 performs encryption (and is sometimes referred to as the "encrypter"). The content provider 22 encrypts content with a particular key or set of keys K. The content provider 22 may store or keep the set of keys K or, alternatively, the authenticator 28 may maintain the set of keys. If so maintained, the authenticator 28 maintains the set of keys K in secret. The content of the content provider is assigned a secret identifying label (e.g., a number that, in general, never changes). The label is given to the authenticator 28 and the authenticator associates the label with the keys needed to decode the encrypted content. The association is indirect, as the association process does not provide any entity access to the actual keys. The encrypted content can now be given to the service provider 24 or another entity without fear of unauthorized decoding, because only the content provider and the authenticator have the actual keys needed to decrypt the content. At this point, the content provider 22 creates the virtual inventory for the content. This involves asking the authenticator 28 for as many mutating IDs as the content provider 22 needs or wants to have. Each mutating ID represents a license allowing exactly one use or consumption of the content. As mentioned earlier, the mutating ID is a number and a key. The content provider 22 encrypts the identifying label with the mutating ID key and groups the mutating ID number and encrypted identifying label into a single piece of data called the "encrypted identifier," which is represented here as "$E_{content}$."

As each piece of content is consumed, the authenticator 28 tracks which service provider 24 the particular content came from and notifies the content provider 22 of each such decoding. Once it receives content, the service provider 24 combines each encrypted piece of content with other identifying data before distribution to the consumer 26. Each service provider 24 keeps a collection of mutating IDs on hand that are used to identify that particular service provider. As with all others, these mutating IDs are created and tracked by the authenticator 28. The service provider 24 also has a list of $E_{content}$ identifiers for each piece of content. Once requested, the service provider 24 picks an unused $E_{content}$ identifier and one of its unused mutating IDs. The service provider encrypts the $E_{content}$ identifier with the key of the chosen mutating ID and attaches the associated number creating a piece of data referred to herein as the "distributable content" or "$E_{distrib}$." The service provider 24 sends the $E_{distrib}$ content to the consumer 26 and awaits a confirmation signal from the authenticator 28 that allows decoding.

The confirmation signal is received as an encrypted parcel of data that can be decrypted with the mutating ID key used to create the $E_{distrib}$ content. The confirmation signal is an agreed on, secret set of bytes set by the service provider 24 and authenticator 28. Once the confirmation has been received and verified, the service provider 24 can send the encrypted content or $E_{content}$ identifier to the consumer 26.

As noted above, it is assumed that the consumer 26 wants to cheat the system 20. For that reason, all communications between the consumer 26 and the authenticator 28 are encrypted by some encrypted communication method. The consumer 26 is given only one mutating ID at a time. When the consumer 26 wants to view or receive some content, the consumer 26 makes a selection of the desired content using the set top box or hardware in place at the site of the consumer 26. The hardware device then requests the content from the service provider 24 who sends the $E_{distrib}$ content for a particular decode. Once this has been received by the consumer 26, the $E_{distrib}$ content is encrypted with the consumer's mutating ID key and coupled with the mutating ID number into a consumer identifier referred to as an $E_{consumer}$ identifier. The $E_{consumer}$ identifier is then sent to the authenticator 28 for verification. Upon verification, the authenticator 28 informs the service provider 24 by a secure channel that the consumer's set top box is licensed to view the subject content. The authenticator 28 also discards the current set top box mutating ID and sends the set top box a new, unused mutating ID.

The consumer 26 simultaneously receives, from separate sources, the encrypted data and keys necessary to decrypt the data. With this, the decoding device can decode the requested content.

Generation of mutating IDs and keeping track of them is the primary task of the authenticator 28. Distribution of mutating IDs to content providers and service providers can be handled via any acceptable means to both, as long as they stay secret to the respective receiver. To ensure that consumers do not ever have more than one mutating ID, once an $E_{consumer}$ identifier is verified as accurate, a new mutating ID is encrypted using the consumer's current mutating ID key and sent to the consumer 26. The consumer can then use that ID for the next transaction. Since the authenticator 28 keeps track of all mutating IDs, it can verify that an $E_{consumer}$ identifier is or contains a valid request. To do so, it finds the key associated with the number in the $E_{consumer}$ identifier and decrypt it, revealing the $E_{consumer}$ identifier. If no key can be found, then the authenticator 28 returns a failure. Using the exact same process, the authenticator 28 recovers the $E_{content}$ identifier. If no key can be found, then the authenticator 28 returns a failure. Once again, the authenticator 28 decrypts the $E_{content}$ identifier, if possible. If it is possible, the authenticator 28 look ups the confirmation code for the service provider 24, encrypts it with the mutating ID key used by the service provider 24, and returns it to the service provider. A new mutating ID is then sent, followed by the decoding data. The authenticator 28 then notes or otherwise records all the participating parties, time, and content involved in the transaction for billing purposes.

As was noted above, one aspect of the invention is to ensure that copies of content are not obtained by unauthorized or unlicensed entities. In the embodiments discussed, obtaining an unauthorized copy of the content would require a person or entity to intercept a message and then break the encrypted content. It is assumed that this is impossible, at least in practical terms, because even if the content was intercepted (which would not be a trivial task) decoding it would be very difficult. This is so, in part, because it is possible, using the random numbers and encryption algorithm discussed to create encrypted data that would require a very long time (on the order of years and in the inventors' opinion, thousands of years) to decrypt. Types of attack would generally require correctly guessing or otherwise obtaining an $E_{consumer}$ identifier. However, since each mutating ID is used only once by the controller of that ID, there is no way to divine one $E_{consumer}$ identifier by inspecting another. Further, since the mutating IDs are calculated to be random (to the limit of the random number generator), it is infeasible to calculate one mutating ID from another.

In addition to providing a high degree of security, the protocol allows for interchangeable parties at each position. In other words, multiple content providers can use multiple service providers to reach multiple consumers using the authenticator 28 agreed upon by all parties. Further, positions can easily be merged or modified to fit many different distribution models. However, it is generally required that the virtual inventory be maintained by the content provider 22 and/or service provider. As noted, the virtual inventory is preferably a list including secret mutating IDs. The virtual inventory may be traded like any other commodity. Thus, rather than a discrete piece of data being the actual digital content of the desired piece of content, it becomes the $E_{consumer}$ identifier constructed by a particular set of events leading to one particular viewing of that content. Since the $E_{consumer}$ identifier cannot be constructed without cooperation from all parties involved, all parties have the ability to negotiate and reach a mutually beneficial arrangement for the consumption of digital content at the demand of the consumer 26. Should one party decide to not participate, communication with the authenticator 28 can prevent decoding by withdrawing the consent of one or more parties.

As was noted above, the system 20 is not limited to just four parties. More distribution layers can be introduced and verified through the unraveling process in the same manner. For instance, one service provider 24 can distribute to another service provider. The authenticator 28 can continue to unravel an $E_{consumer}$ identifier until it has found a content provider 22. This can be accomplished by the simple recursive algorithm used to create $E_{consumer}$ identifiers. The important distinction is that the implementation of the authenticator 28 controls the ultimate decoding of content based upon the $E_{consumer}$ identifier. Should a content provider 22 or service provider 24 want to control the distribution downstream, it is easy to control by informing the authenticator 28 to deny decoding of content under particular circumstances.

Exemplary embodiments of the invention will now be described using several examples.

As with many descriptions of communication protocols, names are assigned to the various entities (or computer systems associated with those entities) used in the protocol. In one embodiment, Alice (A), Bob (B), and Carol (C) represent various participants in a protocol and Trent (T) represents a trusted arbiter of communication. The following table, Table 1, is a list of other symbols used in this document to explain multiple embodiments of the protocol.

TABLE 1

| Symbol | Meaning |
| --- | --- |
| A, B, B', C, T | Entities using the protocol. |
| M | A content item. |
| $X_{id}$ | Some (not secret) digital identifier of X, like an email address, Account number, or the like. |
| $X_{cred}$ | Secret information or credentials that identifies X |
| $K_X$ | A key for a symmetric cipher associated with some entity X. |
| $N_X$ | A one-use number associated with some key $K_X$. |
| H(X) | A function that produces a hash of X. |
| E(K, X) | A cipher that encrypts X with K. |
| D(K, X) | A cipher that decrypts X using K. |
| W(D, X) | A watermark function that applies watermark D to X. |
| X → Y:Z | A message Z sent from X to Y. |
| $\{(N^i_X, K^i_X)\}$ | A set of number/key pairs of arbitrary size associated with entity X. |

An exemplary embodiment of the protocol involves three of the entities discussed above. The entity Alice or A performs the role of the content provider 22, entity Carol or C performs the role of the consumer 26, and entity Trent or T performs the role of the authenticator 28. Since the proposed protocol relies on a trusted authority, Alice and Carol trust Trent. Also, Alice has two secrets: a number ($N_A$) and a key for some symmetric cipher ($K_A$). Similarly, Carol has a secret number ($N_C$) and key ($K_C$). Further, all assigned number and keys are assigned and known by Trent.

For the purposes of this example only, assume Alice wishes to send an electronic mail message $P_1$ securely to Carol. Of course, Alice could represent any entity needing to distribute a variety of content items. Besides text messages, Alice could distribute music, images, video, data, etc. using the same protocol described herein.

To start, if Alice wishes to send the message $P_1$ to Carol, she requests a key for the message $P_1$ that she will use to encrypt $P_1$ and Carol will use to decrypt $P_1$. To do this Alice creates a label for the message $P_1$ by using a function to create a hash of the message and encrypts the label with her $K_A$, and prepends $N_A$.

A→T: $N_A E(K_A, H(P_1))$

When Trent receives the request from Alice and since he knows Alice's secrets, he looks up the key associated with $N_A$ and decodes the request for a key to be used with the message $P_1$. Trent, however, does not receive the message P but only receives a hash of the message $P_1$. He can then generate a key $K_{P1}$ and associate it with the supplied hash for future reference. Using this protocol, messages are kept secure even from Trent and keys generated by Trent offer no useful information regarding the data the key will encrypt. Trent does not receive information that would allow him to directly learn the message generated by Alice or allow him to corrupt the system by sending messages generated by Alice to unwanted parties. Alice also requires a new mutating ID since each number/key pair is valid for one use. Trent supplies Alice with the key $K_{P1}$ for the message $P_1$, a new secret number ($N'_A$), and a new secret key ($K'_A$). Trent encrypts the three elements with Alice's previous secret key and sends the message back to Alice.

T→A: $E(K_A, N'_A K'_A K_{P1})$

Alice notes her new secret number and key received from Trent and encrypts the hash of the message $P_1$ with her new secret key $K'_A$, prepends $N'_A$ and sends the message to Carol.

A→C: $N'_A E(K'_A, H(P_1))$

Upon receiving the message from Alice, Carol encrypts the message with her secret key $K_C$, prepends her secret number $N_C$, and sends the message to Trent.

C→T: $N_C E(K_C, N'_A E(K'_A, H(P_1)))$

Trent realizes that $N_C$ belongs to Carol and can decrypt the outer encryption performed by Carol. Trent can also decrypt the inner encryption performed by Alice since he recognizes $N'_A$ as being Alice's secret key. Once decrypted, Trent determines that $H(P_1)$ is the hash of the message Alice previously sent and that he previously created a key $K_{P1}$ for. Trent then generates a receipt for Alice indicating that she may send Carol the message $P_1$ and sends Carol the key previously generated for the message $P_1$ and the hash of the message $P_1$. The receipt Trent generates for Alice includes the hash of the message Carol is requesting a decryption key for, in the current example, $H(P_1)$ and the identity of Carol $C_{id}$. By identifying both the message and the entity receiving the message Alice can be guaranteed that the correct receiver receives the correct message. Alice may choose not to send the message $P_1$ based on the information contained in the receipt generated by Trent if Carol was not the intended receiver or if the hash of the message is not the intended message for Carol. If Alice chooses not to send the message $P_1$ to Carol, the message $P_1$ is not compromised, even though Carol has received the decryption key $K_{P1}$ from Trent for the message. The key Carol receives, which Trent generated, contains no information concerning the message which it would encrypt, therefore, if Alice does not send the message $P_1$, Carol will not be able to deduce the contents of the message $P_1$ simply by having the key $K_{P1}$. Trent also generates new number/key pairs for both Alice and Carol since both Alice and Carol have used their current secret key and number. Trent concatenates the receipt (Alice's new secret number $N''_A$ and secret key $K''_A$) encrypts the concatenated elements with Alice's current secret key $K'_A$, and sends the message to Alice. Trent concatenates the decryption key $K_{P1}$ for the message P (Carol's new secret number $N'_C$ and secret key $K'_C$) encrypts the concatenated elements with Carol's current secret key $K_C$, and sends the message to Carol.

T→A: $E(K'_A, N''_A K''_A H(P_1) C_{id})$

T→C: $E(K_C, N'_C K'_C K_{P1} H(P_1))$

Upon receiving the message from Trent, Alice can decode the message and determine if the hash $H(P_1)$ returned to her by Trent in the receipt is the same that she sent to Carol. This provides Alice with an opportunity to double-check the message and the intended receiver once more before sending the message. As described above, if any part of the receipt appears fraudulent, for example, if the hash of the message is not the message Alice wished to send Carol or if a receiver other than Carol is requesting decryption keys for the message, Alice can simply not send the message $P_1$ encrypted with the key Trent generated. If everything appears correct, Alice can encrypt the message $P_1$ with the key $K_{P1}$ generated by Trent and send the encrypted message to Carol.

A→C: $E(K_{P1}, P_1)$

Once Carol has received the encrypted message $P_1$ from Alice and the decryption key from Trent, Carol can recover the message $P_1$ by applying the received decryption key to the received encrypted message.

$P_{recovered} = D(K_{P1}, E(K_{P1}, P_1))$

Carol can also verify the message received from Alice, if Carol knows the function that Alice initially used to create the label for the message. Specifically, Carol can compare the hash of $P_{recovered}$ with the hash of the message $P_1$ received from Alice. If the two hashes are identical then Carol can conclude that the encrypted message received from Alice is associated with the initial message hash $H(P_1)$ sent to both Carol and Trent. If the two hashes are not identical, Carol would have reason to believe that fraudulent behavior is at work in the content distribution system.

The email example presented above can be extended to more general problems. The protocol could be used, for example, to authenticate a computer to use the resources provided by a server across a network. Many users connected on a network use applications that depend on virtual private networks ("VPNs") for secure communication. The security of VPNs is built into the network layer of the communication model as defined by the Open Systems Interconnection ("OSI") Model. By using mutating IDs at the application layer, one could create virtual private applications ("VPAs") instead of VPNs. With the use of VPAs email, file systems, and other business level end-user applications could authenticate without the need for complex networking. By securing communication at the application layer, more security is provided at the local area network ("LAN") layer. This also simplifies wide area networks ("WANs") and LAN security to end-users.

Another use of mutating IDs is in authenticating participants to a transaction. Let Alice be a server with resources that Carol, a client computer can utilize. Let Bob represent a user of the client computer Carol who instructs Carol to utilize particular resources. Trent remains the authenticator for the protocol. Assume that Alice, Carol, and Bob all have a secret number N and a secret key K as described previously. Further, assume that Trent knows all secrets and Alice, Carol, and Bob do not know each other's secrets.

Since Alice needs to service many clients at once she needs a large list of number/key pairs. Assuming that Alice already has one number/key pair, she can negotiate with the authenticator, Trent, to get many number/key pairs. Alice first needs to prove to Trent that she is the appropriate server. To do this, she encrypts some identifier that Trent will recognize as belonging to Alice with a request for x number/key pairs.

A→T: $N_A E(K_A, A_{id}$ Send x number/key pairs)

Figure 3B:
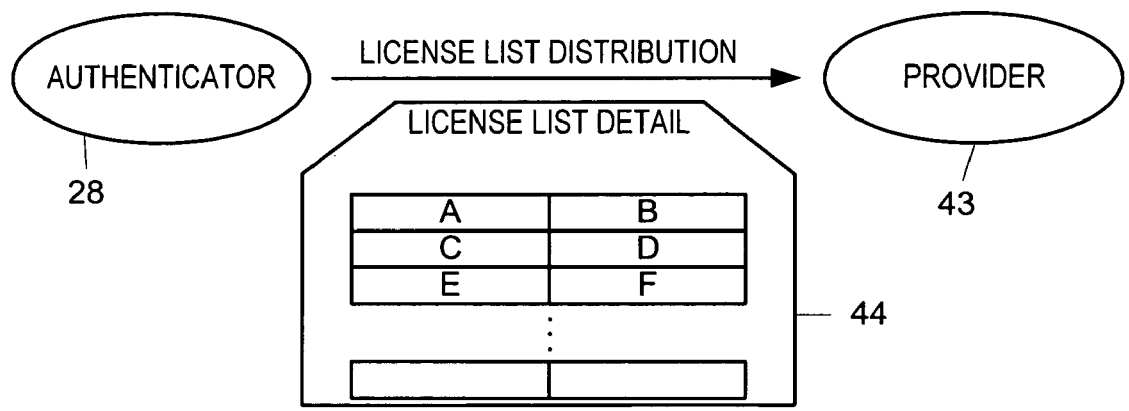
FIGS. 3B and 3C are illustrations of ways to distribute mutating IDs.
Figure 3C:
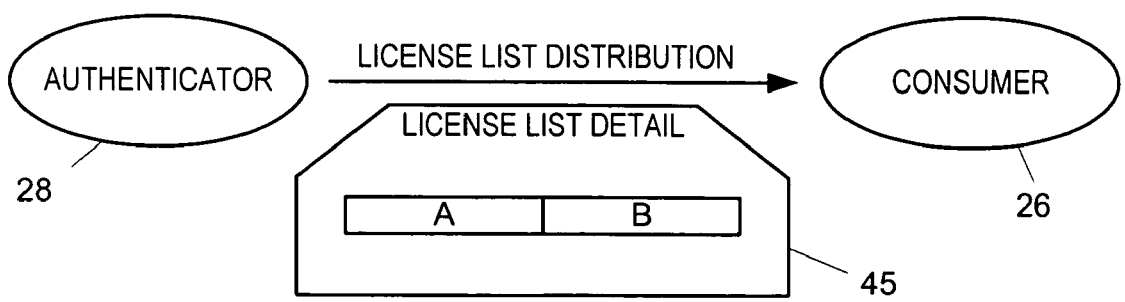

Once Trent validates the request, he generates the number/key pairs and encrypts them with $K_A$ to send the list of pairs back to Alice as shown in FIG. 3B.

T→A: $E(K_A, N^1_A K^1_A N^2_A K^2_A \ldots)$

Alice can now destroy the number/key pair $N_A/K_A$ and Trent marks them as used. This protocol can be run at any time to ensure that a server has enough number/key pairs to service requests.

A user, Bob, supplies his identifying credentials (e.g., a password, a user identifier) to client software on the client computer, Carol, who encrypts Bob's credentials and her own identity with her current secret key and prepends her current number. This is then sent to the requested server, Alice.

$$C \rightarrow A: N_C E(K_C B_{cred} C_{id})$$

Alice then encrypts the received message with one of her keys and prepends the associated number. This is then sent to the authenticator, Trent.

$$A \rightarrow T: N_A E(K_A, N_C E(K_C, B_{cred} C_{id}))$$

Trent can unwrap the encryption of the message to determine that Bob would like to use services resident on the server, Alice. At this point Trent can verify the identity of Bob and Carol and validate that both Bob and Carol are authorized to use the server, Alice. After identity and authorization credentials are checked and approved, Trent can then generate two messages. The first message is destined for Carol, the client computer, and contains, encrypted with $K_{4c}$, a new number/key pair, the identity of the server, Alice, and a session key $K_S$. The second message is destined for Alice, the server, and contains the identity of the user, Bob, the identity of the client computer, Carol, and $K_p$. All the components are then encrypted with $K_A$.

$$T \rightarrow C: E(K_{4c}, A_{id} N'_{4c} K_{4c} K_S)$$

$$T \rightarrow A: E(K_A, B_{id} C_{id} K_S)$$

At this point, the client computer, Carol, knows that the key $K_S$ is safe to use to encrypt all communication with the server, Alice. Furthermore, Alice knows that the identity of the client computer, Carol, and the user, Bob, have been validated by Trent.

As should be apparent, secure validation between entities within an insecure system using the above embodiment of the invention requires a minimum number of steps. In order for Carol to initiate communication with Alice securely, she sends a single message to Alice who then forwards the request to Trent for validation. After the request has been confirmed, Trent sends both Carol and Alice a mutating ID to use to communicate. By allowing Alice to acquire her number/key pairs needed to issue to a requesting entity at any time through the protocol the number of steps required is also reduced. Alice does not need to wait for an entity to request service to ask for a number/key pair from the authenticator nor does an entity need to wait for Alice to acquire a number/key pair one at a time on a need basis.

In comparison, current systems used to establish validated communication between two entities require a larger number of steps that when applied to systems with many services and entities requesting service grow at a high rate. Some current systems require an entity to validate its request with multiple entities before it is allowed to directly communicate with a service. Even the number of steps required for simple tasks, such as logging on, can grow quadratically in respect to the number of components, such as entities and services, associated with the system. Many current systems also rely on timestamps and synchronization of clocks between all participating parties. If any internal clocks differ among the entities, entities may be required to re-authenticate themselves and gain new session keys, which further increases the communication needed to validate the use of a service. When a large number of entities require validation with a large number of services the overhead presented with current systems is believed to be greater than that required by the above described mutating ID system under similar conditions.

Another exemplary embodiment of the protocol involves all of the four entities discussed previously. In this embodiment, Alice or A performs the role of the content provider 22, entity Bob or B performs the role of the service provider 24, entity Carol or C performs the role of the consumer 26, and entity Trent or T performs the role of the authenticator 28. Since the proposed protocol relies on a trusted authority, Alice, Bob, and Carol trust Trent. Also, Alice has two secrets: a number ($N_A$) and a key for some symmetric cipher ($K_A$). Bob also has two secrets: a number ($N_B$) and a key for some symmetric cipher ($K_B$). Similarly, Carol has a secret number ($N_C$) and key ($K_C$). Further, all assigned number and keys are assigned and known by Trent.

For the purposes of this example only, assume Alice is a movie producer with a movie M. Alice would like to use Bob's cable company (e.g., video-on-demand) to distribute the movie M, and Carol, one of Bob's customers, wishes to receive and watch the movie M. Of course, Alice could represent any entity needing to distribute a variety of content items. Alice could distribute email messages, music, images, data, etc. using the same protocol described herein.

To start, if Alice wishes to distribute her content, she requests numerous number/key pairs from Trent. To do this Alice creates a message $P_2$ indicating the request, encrypts the request with her $K_A$, and prepends $N_A$. By encrypting the request with her secret key, Trent can verify that only authorized persons are granted number/key pairs. Alice then sends the message to Trent.

$$A \rightarrow T: N_A E(K_A, P_2)$$

Upon receiving the message from Alice, Trent decodes the request for numerous number/key pairs since he knows Alice's secrets. Referring to FIG. 3B, Trent generates a list of licenses and sends the entire list back to Alice encrypted with Alice's key $K_A$, which is known to both Trent and Alice.

$$T \rightarrow A: E(K_A, \{N^i_A, K^i_A\})$$

Alice now coordinates with Trent to receive a key to encrypt each copy of her movie M. Alice generates a label for M, in the current embodiment a hash of M is used, which is used as an identifier for the movie M. Alice picks some arbitrary number/key pair j and encrypts the hash of M with $K^j_A$, prepends $N^j_A$, and sends the message to Trent.

$$A \rightarrow T: N^j_A E(K^j_A, H(M))$$

Alice could also include a unique identifier $M_{id}$ for the movie M that is known by the other entities of the protocol in the message sent to Trent. The addition of the identifier provides Trent with a mechanism to match and authorize requests for encrypted content.

$$A \rightarrow T: N^j_A E(K^j_A, H(M) M_{id})$$

Upon receiving the message from Alice, Trent generates a key $K_M$ associated with the hash of the movie M and sends it back to Alice encrypted with $K^j_A$. Trent records that the sent key $K_M$ is associated with the hash of the movie M (and the unique identifier $M_{id}$ if provided). Even though Trent is generating the key for encrypted content, he never receives the content. All Trent receives is the hash of the movie M and possibly a unique identifier that is known by all entities of the system. He has no other useful information regarding the content provided by the content provider. Trent has no information that would allow him to directly distribute content without the intervention and authorization of the content provider.

T→A: $E(K^j{}_A, K_M)$

Alice can now encrypt M with $K_M$ with the confidence that only she and Trent know $K_M$. She encrypts M with $K_M$ and sends it to Bob.

A→B: $E(K_M, M)$

Alice also sends Bob corresponding primary licenses for the encrypted copy. We call the license sent by the content provider a primary license since it may be further authenticated by a service provider before it is distributed. Alice creates each primary license by encrypting the hash of the movie M with a key $K^k{}_A$ and prepending a number $N^k{}_A$ of an arbitrarily chosen number/key pair k from the list generated by Trent. Alice sends each primary license to Bob.

A→B: $N^k{}_A E(K^k{}_A, H(M))$

Although Bob has received both the encrypted content and the corresponding primary license, he still is unaware of the decryption key and so cannot distribute copies of M that Alice would be unaware of. He could distribute either the encrypted content or the primary license to as many consumers as he wished without interaction from Alice or Trent, but the consumers would be unable to view encrypted content or use the primary license. Bob also has no information regarding the content Alice is providing from either the encrypted copies or the primary license. By providing Bob with licenses, Alice can restrict the number of copies of content Bob can deliver since each license will be marked as used by Trent after it has been issued to a consumer. With a valid license from Alice, a service provider and consumer cannot gain content. Alice should have at least one number/key pair remaining that is known to Trent. If Alice needs more number/key pairs, she could use the one remaining number/key pair to request more from Trent.

Once Bob has received the encrypted copies of M and the corresponding primary licenses signed by Alice, he further authenticates each primary license sent by Alice to place his ownership on the content before the license is distributed to consumers. Having Bob further authenticate each primary license is not required, but protection is increased for Alice's movie M since Alice can ensure that requests for content items have been properly initiated through authorized distributors. In order to add greater authorization to each primary license, Bob first requests numerous number/key pairs from Trent in a manner similar to how Alice acquired numerous number/key pairs defined above. Bob creates a message $P_3$ indicating the request, encrypts the request with his $K_B$, and prepends $N_B$. Bob then sends the message to Trent.

B→T: $N_B E(K_B, P_3)$

When Trent receives the message from Bob, he looks up the key associated with $N_B$, since he knows Bob's secrets, and decodes the request. He then generates the numerous number/key pairs requested and sends them back to Bob encrypted with $K_B$.

T→B: $E(K_B, \{N^i{}_B, K^i{}_B\})$

Clearly, Bob could request the number/key pairs before or after receiving the encrypted copies from Alice. He does not need to send anything that he receives from Alice in order to request number/key pairs from Trent. He simply needs to be identifiable to Trent as an entity that can request and receive number/key pairs.

After Bob has received the number/key pairs from Trent he can create a distributable license, a license that can be distributed to requesting consumers, by choosing an arbitrary number/key pair m from the list Bob received from Trent and encrypting an encrypted identifier received from Alice with the key $K^m{}_A$ and prepending the number $N^m{}_A$ from the chosen number/key pair m.

$N^m{}_A E(K^m{}_A, N^k{}_A E(K^k{}_A, H(M)))$

Bob repeats this procedure for however many distributable licenses he wishes to distribute or is authorized to distribute by Alice.

Now that Bob has the content, we can address the next step of the process. Carol wishes to view content M and sends a request for M to Bob that includes the unique identifier for the movie M.

C→B: Send $M_{id}$

Carol's request for content may be encoded to protect it from corruption. Without encoding the request, Carol's request could be intercepted and changed, and Carol may receive content that she did not intend to purchase. Carol can protect her request by encoding it with a secret key shared between Bob and her. Carol could also send her request to Bob using one of the previously disclosed embodiments of the invention. Overall, Carol could use any security mechanism to secure her request.

Bob receives the request from Carol and replies by choosing one of the distributable licenses he previously generated for the movie M identified by the unique identifier $M_{id}$ included in Carol's request. Bob sends the distributable license to Carol and notes that the license has been used and sent to Carol.

B→C: $N^m{}_B E(K^m{}_B, N^k{}_A E(K^k{}_A, H(M)))$

After receiving the distributable license from Bob, Carol encrypts it with her key $K_C$ and prepends her number $N_C$. Carol sends the encrypted distributable license to Trent.

C→T: $N_C E(K_C, N^m{}_B E(K^m{}_B, N^k{}_A E(K^k{}_A, H(M))))$

Upon receiving the encrypted distributable license from Carol, Trent can unwrap all of the encryption, since he knows Carol's, Bob's, and Alice's secrets, and can determine that Carol received a valid license and needs the decryption key for the content M. Recovering this information allows Trent to generate a receipt for Bob by concatenating Bob's primary license with the identity of Carol and encrypting it with the key it was originally signed with $K^m{}_B$ and prepending the number originally prepended when Bob signed the license $N^m{}_B$. Trent sends the receipt to Bob.

T→B: $N^m{}_B E(K^m{}_B, N^k{}_A E(K_k{}^A, H(M) C_{id}))$

The receipt Bob receives from Trent not only informs Bob that Carol has been authorized as a consumer, but it also directs Bob to send the matching encrypted copy of the content specified by the hash H(M) to Carol. Bob is also able to verify that the distributable license Carol forwarded to Trent is the same distributable license that he initially sent Carol. Carol cannot substitute a different distributable license nor can another consumer use a distributable license that Carol received from Bob. After Bob has inspected the receipt from Trent, he sends the requested encrypted copy to Carol.

B→C: $E(K_M, M)$

Carol also requires both the decryption key necessary to decipher the received encrypted copy of M and a new number/key pair so she is able to make a second request for content, since she consumed her old mutating ID with her request for the movie M. Trent, knowing the content requested M and the key used to encrypt a copy of M, since he created it, sends the key to Carol along with a new number/key pair to be used for future requests. Trent concatenates the new number/key pair with the needed key for the encrypted copy of M and encrypts the elements with Carol's current key $K_{4C}$. Trent does not need to prepend Carol's assigned number $N_C$ since Carol only has one number/key pair and does need to look up a matching key given a number from a list of number/key pairs as does Alice and Bob. Thus, Trent sends the following to Carol.

T→C: $E(K_C,N'_C K'_C K_M)$

Alternatively, if Alice has provided a unique identifier to Trent for the encrypted content, which is known by Carol, Trent can ask Carol for a final commitment for the content before sending the decryption key. Trent can send Carol a new number/key pair and the unique identifier $M_{id}$ corresponding to the content specified in the distributable license Trent received from Carol.

T→C: $E(K_C,N'_C K'_C M_{id})$

Since the unique identifier is known by all participating entities, Carol can verify that the decryption key she is about to receive from Trent is for the content that she requested. If the identifier does not correspond to the content she requested, Carol knows that her initial request either contained faults or was compromised, and she can stop Trent from providing a decryption key for the content. By requesting final authorization before sending a decryption key, Carol may avoid charges for content that she did not want. Otherwise, if the identifier does match the content requested, Carol can authorize Trent to send the decryption key.

C→T: $E(K_C, \text{Authorize})$

T→C: $E(K_C,K_M)$

Carol now has everything she needs to watch the movie M.

Trent could also generate a receipt for Alice at this point, allowing her to track a consumer to particular content. Trent can concatenate the label of M and Carol's identity C and encrypt all the elements with Alice's key $K^k_A$ and prepend the number $N^k_A$ used in the license sent to Carol.

T→A: $N^k_A E(K^k_A,H(M)C_{id})$

Trent also can mark all the number/key pairs encountered during the transaction ($\{K^k_A, N^k_A\}, \{K^m_B, N^m_B\}, \{K_C, N_C\}$) as used so that should he encoun future, he will know that something is amiss. That is, Trent can ensure that each number/key pair is used once and only once. Accordingly, any reuse indicates that an entity or person is attempting to defraud the system.

At this point Alice knows that Bob distributed a copy of the movie M to Carol. However, Alice cannot track a specific copy of the movie M to Bob or Carol. If an illegally distributed copy of the movie M appears in the market it cannot be traced to a specific service provider or consumer. Alice can only generate a list of entities that licensed the content. This freedom from tracking encourages consumers who legally purchase a copy of the movie M to illegally distribute the acquired copy.

In another embodiment, Alice can trace a particular copy of a content item to a service provider and a consumer by uniquely watermarking each copy created and distributed. By providing Alice a means to track specific copies to specific consumers, consumers who purchase content legally may be deterred from dishonestly replicating the acquired copy.

In one watermarking embodiment, the entity Alice or A again performs the role of the content provider 22, entity Bob or B performs the role of the service provider, entity Carol or C performs the role of the consumer 26, and entity Trent or T performs the role of the authenticator 28.

Similar to the non-watermarking embodiment with four entities, Alice requests numerous number/key pairs from Trent with an encrypted message $P_4$.

A→T: $N_A E(K_A,P_4)$

When Trent receives the message from Alice he generates a list of number/key pairs and sends the entire list back to Alice.

T→A: $E(K_A,\{N^i_A,K^i_A\})$

Once Alice receives the numerous number/key pairs she can choose to further protect her content by applying a unique watermark to each copy of M. Alice generates a list of watermarks $D_1, D_2, \ldots, D_n$ and a watermarking scheme W for her movie M. Alice can then generate many different hashes for M, one for each watermark. Consider:

$M_1 = W(D_1,M)$ $M_2 = W(D_2,M)$ $M_3 = W(D_2,M)$

In contrast with the non-watermarking embodiment, Alice can now coordinate with Trent to receive a key to encrypt each watermarked copy of her movie M instead of receiving a single key to encrypt her movie M. Alice generates a label for M and a hash of each watermark $D_1, D_2, \ldots, D_n$, and picks some arbitrary number/key pair j. Alice encrypts both the hash of M and hash of an individual watermark $D_1$ with $K^j_A$, prepends $N^j_A$, and sends the message to Trent.

A→T: $N^j_A E(K^j_A,H(M)H(D_1))$

As noted in the previous embodiment, Alice could also provide a known identifier for the movie $M_{id}$ in the message to Trent so that Trent can use the identifier later to request final authorization from a consumer.

A→T: $N^j_A E(K^j_A,H(M)H(D_1)M_{id})$

Upon receiving the message from Alice, Trent generates a key $K_{M1}$ associated with the hash of the movie M and sends it back to Alice encrypted with $K^j_A$. Trent records that the sent key $K_{M1}$ is associated with the hash of the movie M and the hash of the watermark $D_1$ (and the known identifier $M_{id}$ if provided). Even though Trent is generating the key for encrypted, watermarked content, he never receives the decrypted, watermarked content. Again, Trent has no useful information regarding the content provided by Alice.

T→A: $E(K^j_A,K_{M1})$

Alice can now encrypt $M_1$, the watermarked content and send it to Bob.

A→B: $E(K_{M1}M_1)$

Alice also sends Bob the corresponding primary license for the encrypted, watermarked copy. Alice creates the primary license in the same format as she did in the non-watermarking embodiment but concatenates the hash of the watermark to the hash of the movie M.

A→B: $N^k_A E(K^k_A,H(M)H(D_1))$

Once Bob has received the encrypted, watermarked copies of M and the corresponding primary licenses signed by Alice, he authenticates each primary license as he did in the non-watermarking embodiment. As noted before, Bob's authentication of each primary license is not necessary, but it does offer added protection and security with the communication system. Bob first acquires numerous number/key pairs from Trent by sending Trent a message $P_5$.

B→T: $N_B E(K_B, P_5)$

As before, Trent receives the message from Bob, generates the numerous number/key pairs requested, and sends them back to Bob encrypted with $K_B$.

T→B: $E(K_B, \{N^i{}_B, K^i{}_B\})$

Again, Bob could request the number/key pairs before or after receiving the encrypted, watermarked copies from Alice.

Similar to the non-watermarking embodiment, after Bob has received the number/key pairs from Trent he can create a distributable license.

$N^m{}_A E(K^m{}_A, N^k{}_A E(K^k{}_A, H(M)H(D_1)))$

Bob repeats this procedure for however many distributable licenses he wishes to distribute or is authorized to distribute by Alice.

When Carol wishes to view content M, she sends a request for M to Bob.

C→B: Send $M_{id}$

As noted before, further encryption could be applied to Carol's request to ensure that her message is not compromised.

As before, Bob receives the request from Carol and replies by choosing one of the distributable licenses he previously generated. Bob sends the distributable license to Carol.

C→T: $N^m{}_B E(K^m{}_B, N^k{}_A E(K^k{}_A, H(M)H(D_1)))$

After receiving the distributable license from Bob, Carol encrypts it with her key $K_C$ and prepends her number $N_C$ exactly as she did in the non-watermarking embodiment and sends the encrypted distributable license to Trent.

C→T: $N_C E(K_C, N^m{}_B E(K^m{}_B, N^k{}_A E(K^k{}_A, H(M)H(D_1))))$

Upon receiving the encrypted distributable license from Carol, Trent can unwrap all of the encryption, since he knows Carol's, Bob's, and Alice's secrets, and can determine that Carol received a valid license and needs the decryption key for the content M watermarked with watermark $D_1$. Similar to the non-watermarking embodiment, Trent generates a receipt for Bob.

T→B: $N^m{}_B E(K^m{}_B, N^k{}_A E(K^k{}_A, H(M)H(D_1))C_{id})$

The receipt Bob receives from Trent not only informs Bob that Carol has been authorized as a consumer, but it also directs Bob to send the matching encrypted copy of the content specified by the hash H(M) and the hash $H(D_1)$ to Carol.

B→C: $E(K_{M1}, M_1)$

As in the non-watermarking embodiment, Trent sends the decryption key for the encrypted, watermarked copy of the movie Carol receives from Bob along with a new number/key pair Carol can use for future requests.

T→C: $E(K_C, N'_C K'_C K_{M1})$

As mentioned before, Trent could additionally request final authorization at this point if he knows an identifier, which is known to all entities, for the content requested. Trent can provide the identifier to Carol who can verify that the decryption key she is about to receive is for the content she requested. Once Trent receives Carol's verification he can send the needed decryption key.

Carol now has everything she needs to watch the movie M.

As before, Trent could also generate a receipt for Alice at this point, allowing her to track a consumer to a particular watermarked copy. Trent can concatenate the label of M, and the hash of the watermark $H(D_1)$, and Carol's identity C and encrypt all the elements with Alice's key $K^k{}_A$ and prepend the number $N^k{}_A$ used in the license sent to Carol.

T→A: $N^k{}_A E(K^k{}_A, H(M)H(D_1)C_{id})$

Trent also can mark all the number/key pairs encountered during the transaction ($\{K^k{}_A, N^k{}_A\}, \{K^m{}_B, N^m{}_B\}, \{K_C, N_C\}$) and the watermark $D_1$ as used can be recognized as fraudulent behavior.

Alternatively in another watermarking embodiment, Bob, rather than Alice, applies the watermark to the content copies. Alice sends Bob a single encrypted version of the movie M and may also provide a list of watermarks to apply. Bob then coordinates with Trent to receive the decryption key for the content. After receiving the decryption key Bob decodes the encrypted content, applies watermarks to the decrypted content, and encrypts the watermarked content with another encryption key different from the first used by Alice. By allowing Bob to watermark the distributable content, less communication is needed and less data is transmitted between the content provider and the service provider. The service provider may also perform the decryption and watermarking on the fly when the request for content is made. By watermarking the content when needed, the amount of storage required by the service provider is reduced since he does not need to retain multiple encrypted, watermarked versions of content. Since Alice provides her content encrypted but unwatermarked, another entity of the protocol must be trusted to decrypt Alice's content, apply a watermark, and encrypt the watermarked content again before it is sent to consumers. Bob could be trusted to perform the decryption and watermarking, but Alice may also insist that Bob use a special piece of hardware that protects the security of her content. By requiring the decryption and watermarking to occur in hardware (which is inaccessible by the service provider) in real-time, the security of Alice's content is preserved. The content is sent to special hardware of the service provider that decodes the content, applies a watermark, and encodes the content again. The hardware prevents the service provider from accessing the decrypted content since the content enters the hardware encrypted and exits the hardware watermarked and encrypted. For the protocol to work, the content provider must trust the security of the special hardware. The authorized special hardware, or decoding entity, that will decode and watermark content provided by Alice is denoted as B' or Brenda in the following detailed example.

As before Alice wishes to distribute her movie M and wants to track consumers to a specific copy of her movie. However, Bob does not want to receive and store multiple encrypted and watermarked copies of Alice's content. In order to reduce communication and data traffic between Alice and Bob, Bob will watermark and encrypt the content provided by Alice.

Alice begins by requesting numerous number/key pairs from Trent that she will use, in contrast to the previous two embodiments, to create a list of encrypted watermarks. After Alice receives the number/key pairs from Trent, she then requests an encryption key for the movie M. In addition, Alice may specify who should be allowed to decode the movie in order to apply a watermark in her request to Trent.

In the current example Brenda will be authorized to apply watermarks. Alice may also include a known identifier for the movie $M_{id}$ that can be used by Trent to validate requests before sending decryption information.

A→T: $N_A E(K_A, H(M)M_{id}B')$

Trent responds with an encryption key for the movie $K_M$.

T→A: $E(K_A, K_M)$

Once Alice receives the encryption key $K_M$ she can encrypt the movie M and a hash of the movie H(M) and send the encrypted content to Bob.

A→B: $E(K_M, H(M)M)$

Alice also generates a list of watermarks $D_1, D_2, \ldots, D_n$ to be applied to the copies of the encrypted content. Each watermark will be concatenated with a hash of the movie H(M) and possibly a known identifier for the movie $M_{id}$. Each concatenated list is encrypted with one of the number key pairs Alice received from Trent. Alice sends the list of encrypted watermarks to Bob. Alternatively, Alice could allow Bob to generate the watermarks to be applied to her content. By having Bob create the watermarks even less communication and data is transmitted between Alice and Bob.

A→B: $N^1_A E(K^1_A, H(M)D_1 M_{id}), N^2_A E(K^2_A, H(M)D_2 M_{id}), \ldots, N^3_A E(K^3_A, H(M)D_3 M_{id})$ Bob now has a list of encrypted watermarks and the encrypted movie M that can only be decrypted by Brenda since that is what was specified by Alice in her request to Trent. In order to prepare to distribute content, Bob and Brenda request numerous number/key pairs from Trent.

Once Bob receives a request from Carol for the movie M, Bob provides Brenda with an encrypted watermark that he received from Alice encrypted with an arbitrarily chosen number/key pair from the list provided by Trent.

B→B': $N^a_B E(K^a_B, N^1_A E(K^1_A, H(M)D_1 M_{id}))$

Brenda chooses an arbitrary number/key pair from the list generated by Trent and further encrypts the doubly-encrypted watermark received from Bob. Brenda then sends the thrice-encrypted watermark to Trent.

B'→T: $N^a_B E(K^a_B, N^a_B E(K^a_B, N^1_A E(K^1_A, H(M)D_1 M_{id})))$

Trent decodes all of the encryption, since he knows everyone's secrets, and returns the hash of the movie H(M), the watermark $D_1$, the key to decode the move $K_M$, a new key to encode the movie $K_{M'}$, and Bob's identity $B_{id}$ to Brenda.

T→B': $E(K^a_B, H(M)D_1 K_M K_{M'} B_{id})$

Brenda also encrypts the same doubly-encrypted watermark received from Bob with another arbitrarily chosen number/key pair. Brenda sends the second thrice-encrypted watermark to Carol.

B'→C: $N^b_B E(K^b_B, N^a_B E(K^a_B, N^1_A E(K^1_A, H(M)D_1 M_{id})))$

Carol encrypts the received message with her single number/key pair and, as before, forwards the encrypted message to Trent.

C→T: $N_C E(K_C, N^b_B E(K^b_B, N^a_B E(K^a_B, N^1_A E(K^1_A, H(M)D_1 M_{id})))$

Trent unwraps all of the encryption and verifies with Carol that she did intend to get the movie identified in the message.

T→C: $E(K_C, N'_C K'_C M_{id})$

Carol responds with authorization if the content identifier $M_{id}$ corresponds to the content she requested.

C→T: $E(K_C, \text{Authorize})$

Trent then sends the decryption key $K_M$ to Carol and generates a receipt for Bob. Bob's receipt contains the encrypted watermark Bob initially sent to Carol along with Carol's identity.

T→B: $N^a_B E(N^1_A E(K^1_A, H(M)D_1 M_{id})C_{id})$

Trent also generates a receipt for Alice so that she can associate a watermarked copy of the movie M with Carol. Alice's receipt includes the hash of the movie H(M), the watermark applied $D_1$, and the identity of the consumer $C_{id}$. Alice's receipt is encrypted with the number/key pair Alice used to encrypt the watermark that will be associated with the content licensed to Carol.

T→A: $N^1_A E(K^1_A, H(M)D_1 C_{id})$

Upon receiving the receipt from Trent, Bob sends Brenda the encrypted movie that he received from Alice.

B→B': $E(K_M, H(M)M)$

Brenda decrypts the encrypted movie since she received the decryption key KM from Trent. Brenda decodes the movie to recover the movie M, applies the watermark $D_1$, and encrypts the watermarked movie $W(D_1, M)$ with the new encryption key $K_{M'}$. The hash of the movie H(M) Alice encrypted with the movie allows Brenda to check that the movie has not been switched for another and that the decryption key received from Trent is the matching key for the encrypted content. Once the movie M has been decrypted, watermarked, and encrypted, Brenda sends the encrypted, watermarked content to Carol.

B'→C: $E(K_{M'}, W(D_1, M))$

Carol has already received the decryption key from Trent, so she can decrypt the encrypted, watermarked content and view the movie M.

If Carol decides to make and distribute illegal copies of the content she received, any illegal copy found in the market that Carol distributed can be traced back to Carol by the watermark applied to the content (regardless of the particular embodiment of the invention used to apply the watermark). Both Bob and Alice receive receipts that link a particular watermark to a particular consumer. Knowing this, Carol may be deterred from distributing illegal copies of content, since the copies can be traced back to her. Carol may also keep a closer guard of her copy so that no one else takes her content and distributes it illegally. The rights of the content provider and service provider are enhanced through the use of the watermarking.

Another feature that could reduce the amount of illegal copying is requiring a real-time decode of the movie or content. Depending on the hardware implementation chosen, a real-time decode may be possible that would require any recording of content downloaded via the proposed system to take the same amount of time required to watch or consume the content at its intended playback speed. The decode output could also be implemented as an analog signal that would reduce the fidelity of subsequent recordings.

Additional aspects of embodiments of the invention will now be described with respect FIGS. 4-16.

FIG. 5 illustrates the overall process of the consumer 26 requesting content in one embodiment of the invention. First, the consumer 26 makes a request for a particular piece of content (step 50). The request may include an identifier or label associated with the particular piece of content that the consumer found using a search engine or catalog of available content. The label may also be a title of the content such as a movie title or song title. The service provider 24 then requests an encrypted license 52 from the content provider 22 that is associated with the desired content. The service provider sends the license 52 to the customer 26 (step 54). The customer's hardware (e.g., a set top box), encrypts the license 52 with a mutating ID (previously received from the authenticator 28) and sends the now doubly encrypted license 52 to the authenticator 28 (step 56). The authenticator 28 checks the license 52 for validity. If the license is valid, the authenticator 28 so informs the service provider (step 58). The service provider then sends the content to the consumer 26 (step 60). At the same or nearly the same time, the authenticator 28 sends decoding information to the consumer 26 (step 62).

Figure 4:
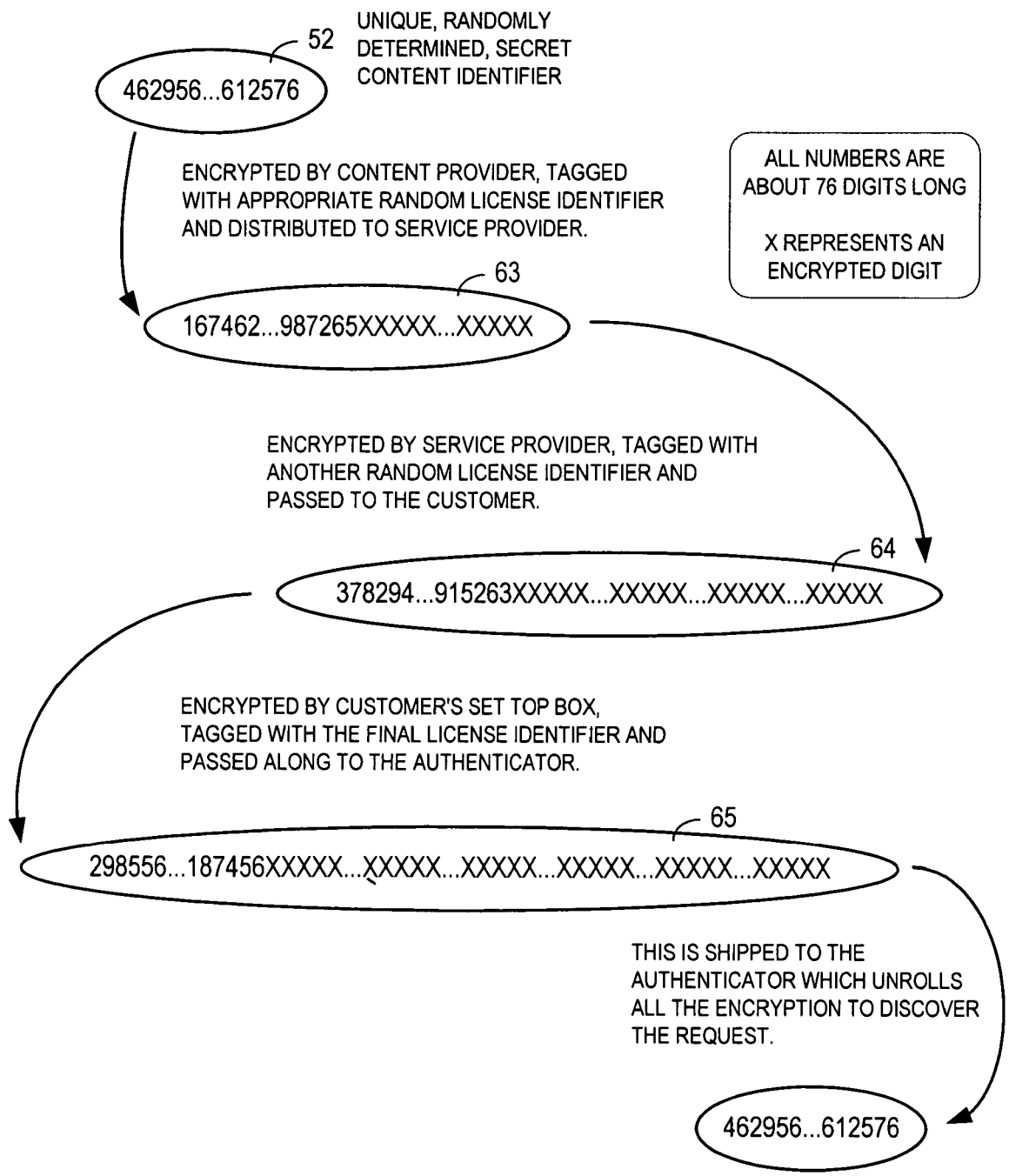
FIG. 4 is a schematic illustration of a license structure for one exemplary embodiment of the invention.

As should be apparent from the discussion above, the license 52 undergoes multiple transformations, in the sense that the license is encrypted multiple times. FIG. 4 illustrates this process. The content provider creates the license 52 upon receiving a request for particular content. The license is an encrypted version of the randomly determined, secret identifier that the content provider created for the subject content. The now once encrypted version of the license (license 63 in FIG. 4) is sent to the service provider 24. The service provider 24 encrypts the license again (license 64 in FIG. 4) and the now doubly encrypted version is sent to the consumer 26. The doubly encrypted license is encrypted with the mutating ID of the consumer to create a thrice-encrypted version (license 65 in FIG. 4). Authentication or verification of the license and ultimately delivery and decoding of information is then performed as noted in the discussion above with respect to FIG. 5. FIG. 6 provides another illustration of the process, including the multiple encryption steps.

Figure 7:
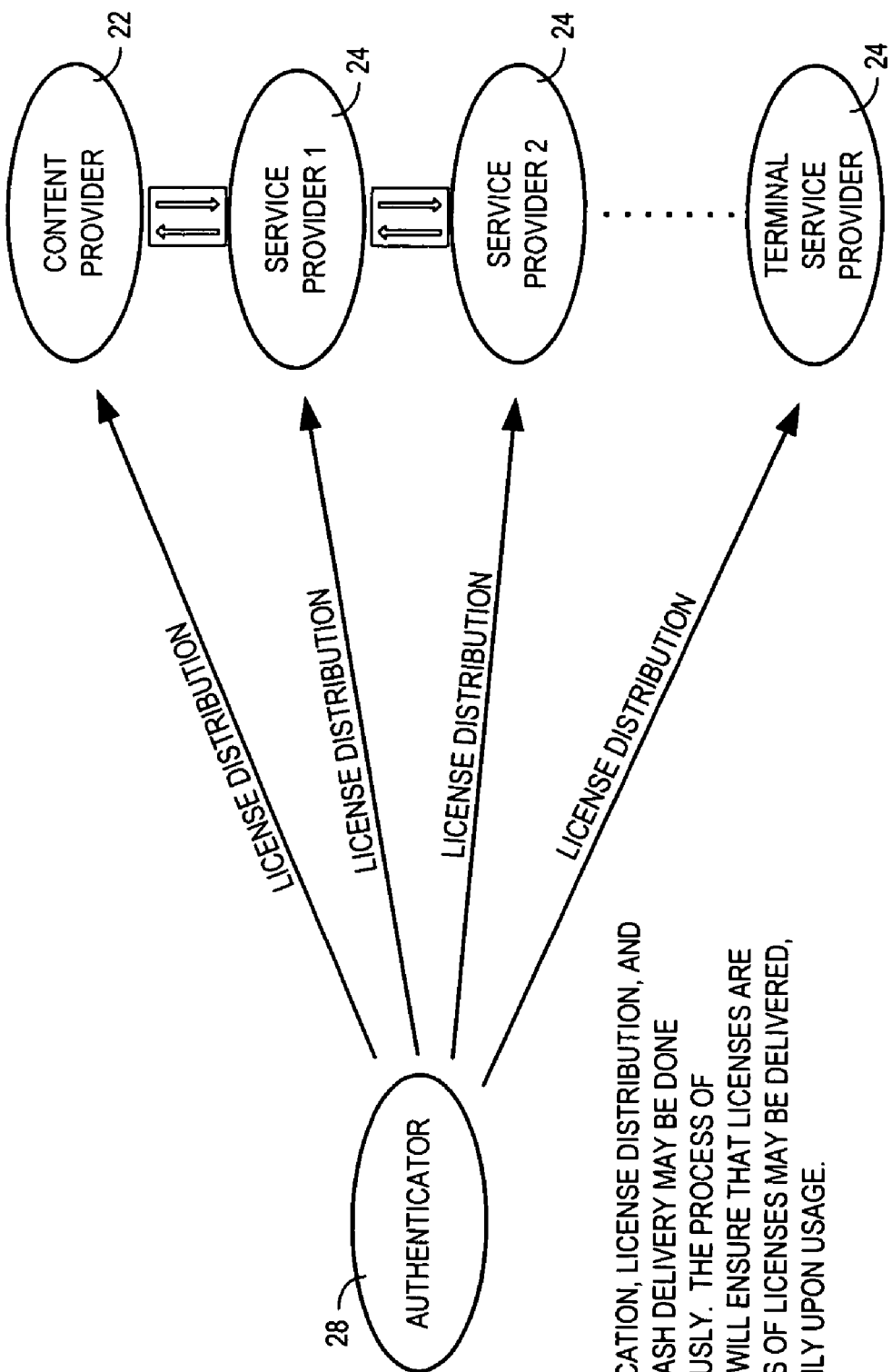
FIG. 7 is a schematic illustration of a portion of the system shown in FIG. 1, illustrating license distribution to multiple service providers.

FIG. 7 illustrates that embodiments of the invention may include multiple service providers. Furthermore, it is envisioned that service providers may have their own content or licenses to particular content that other service providers may desire. Thus, various requests for and transfers of licenses (as shown) may occur between service providers in order to make a large variety of content available to the ultimate consumers of the various service providers participating in the system 20.

Figure 8:
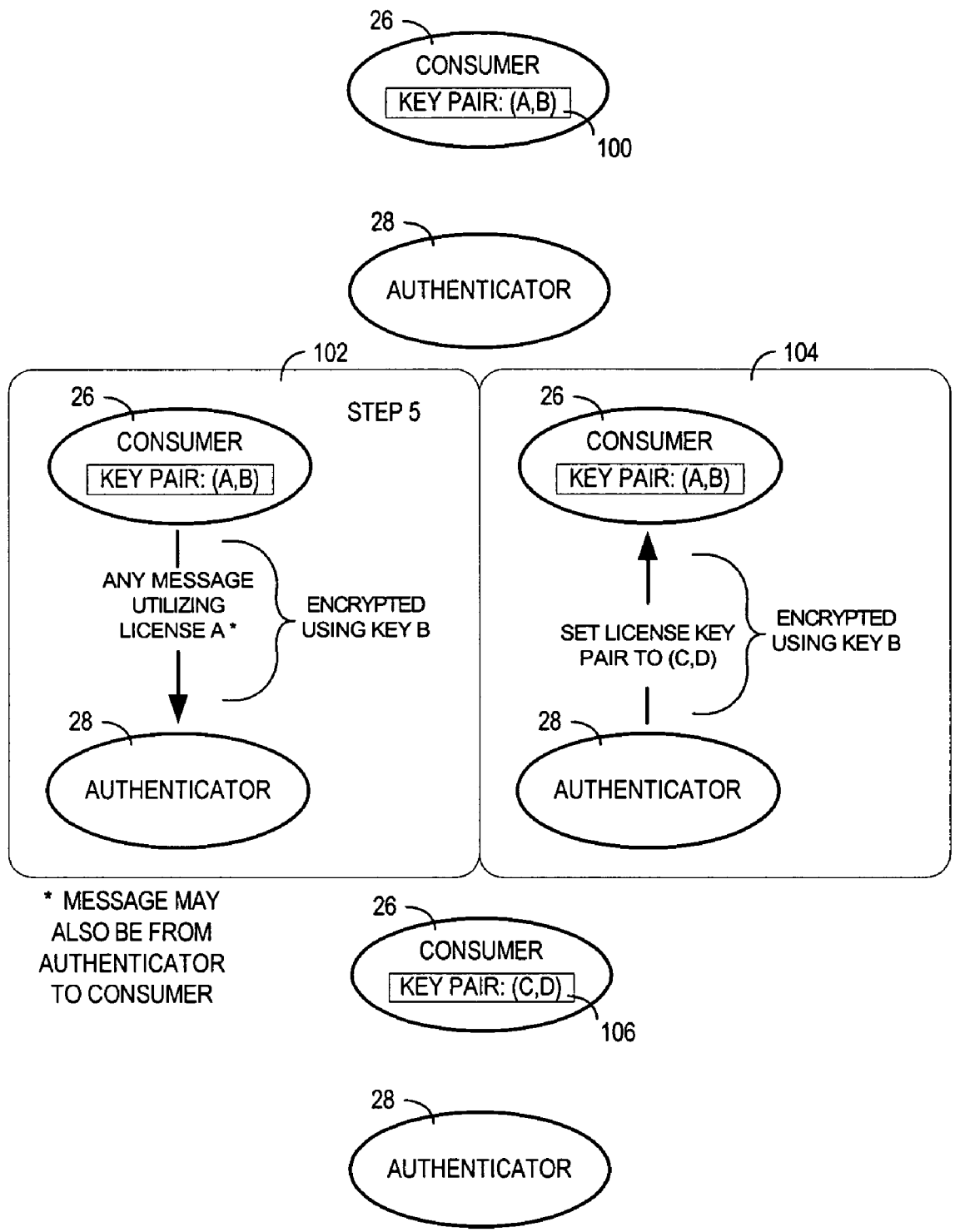
FIG. 8 is a schematic illustration of a mutating identifier cycle used in one form of the invention.

FIG. 8 illustrates how mutating IDs are implemented in one embodiment of the invention. As shown, the consumer 26 is assigned a first mutating ID 100. The consumer uses that mutating ID to confirm its identity (as shown in box 102, which corresponds to step 56 in FIG. 5). However, once the license 100 is used, the authenticator modifies the license 100 or, in other words, sends a new key pair to the consumer, as shown in box 104. The new key pair, in effect, creates a new mutating ID 106.

Figure 9A:
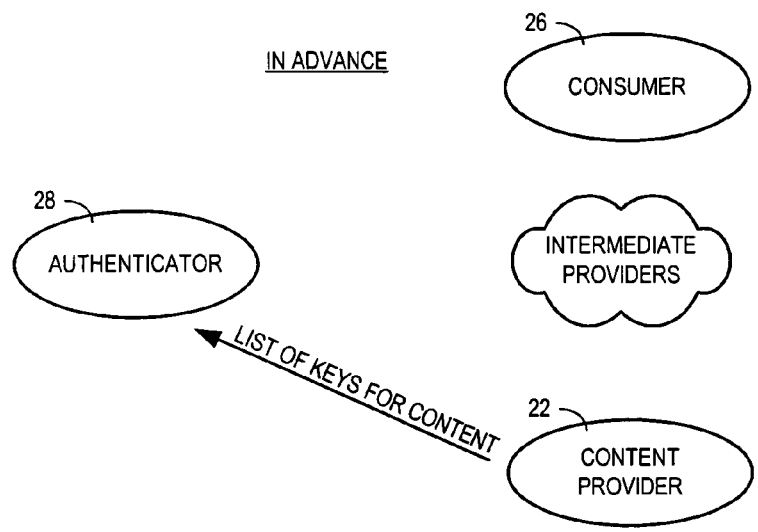
FIG. 9*a* is an exemplary schematic illustration of content key management in one embodiment of the invention.
Figure 9B:
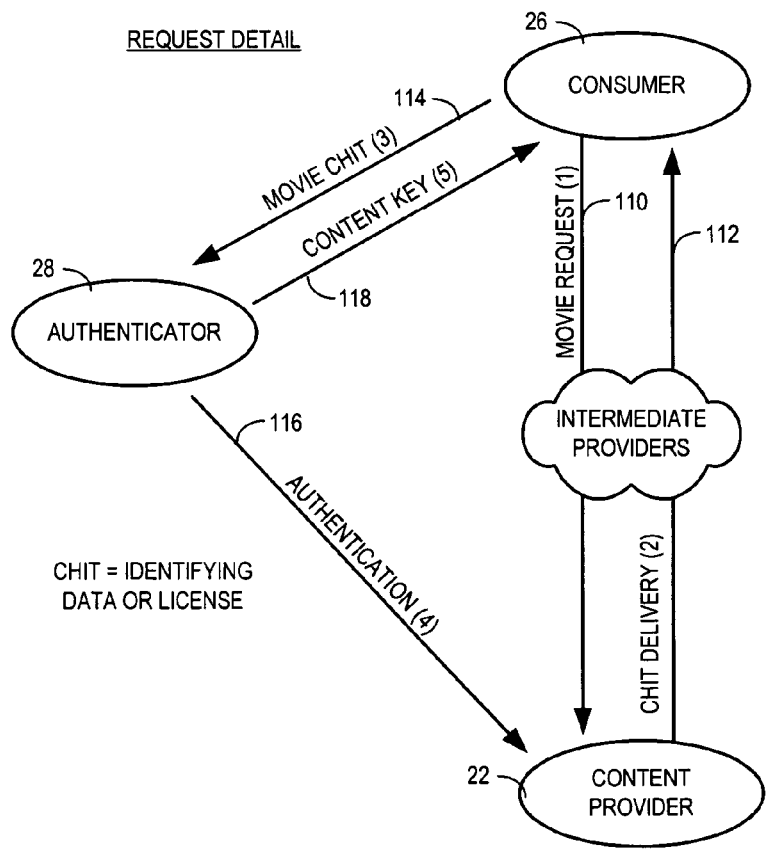
FIG. 9*b* is an exemplary schematic illustration of data flows that occur when content is requested under the situation illustrated in FIG. 9*a*.

FIGS. 9a and 9b illustrate one way of managing content keys. If desired, the system 20 may be set up or configured such that the content provider 22 provides a list of content keys to the authenticator 28. If the system 20 is implemented in this fashion, a request made by the consumer 26 for content is transferred (through one or more intermediary service providers and/or other content providers) to the content provider 22 (step 110 in FIG. 9b). The content provider then sends a license to the consumer 26 (again, through one or more intermediary service providers) (step 112). The consumer 26 then sends its content license to the authenticator for verification or authentication (step 114). If verified, verification information is sent to the content provider 22 (step 116). The authenticator 28 then sends the content key to the consumer 26, so that the content can be decoded and viewed (step 118).

Figure 10A:
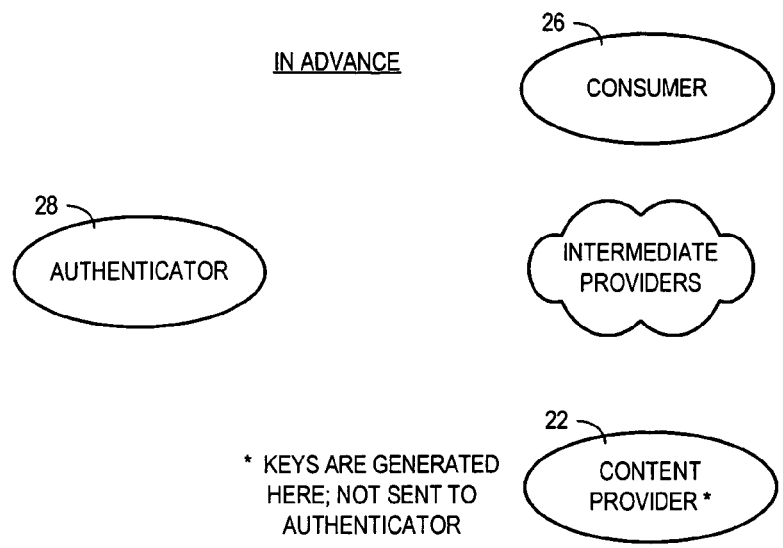
FIG. 10*a* is an exemplary schematic illustration of content key management in another embodiment of the invention.
Figure 10B:
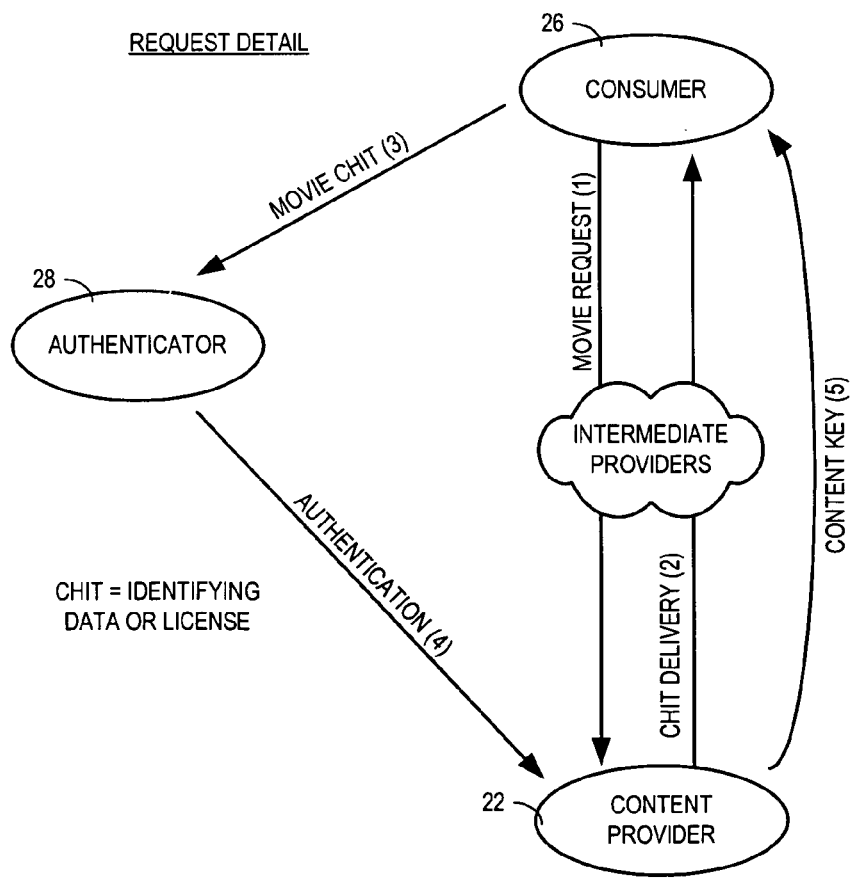
FIG. 10*b* is an exemplary schematic illustration of data flows that occur when content is requested under the situation illustrated in FIG. 10*a*.

FIGS. 10a and 10b illustrate another way of managing keys. The overall process is similar to what was described above with respect to FIGS. 9a and 9b, except that no keys are sent to the authenticator 28, but maintained with the content provider 22.

Figure 11:
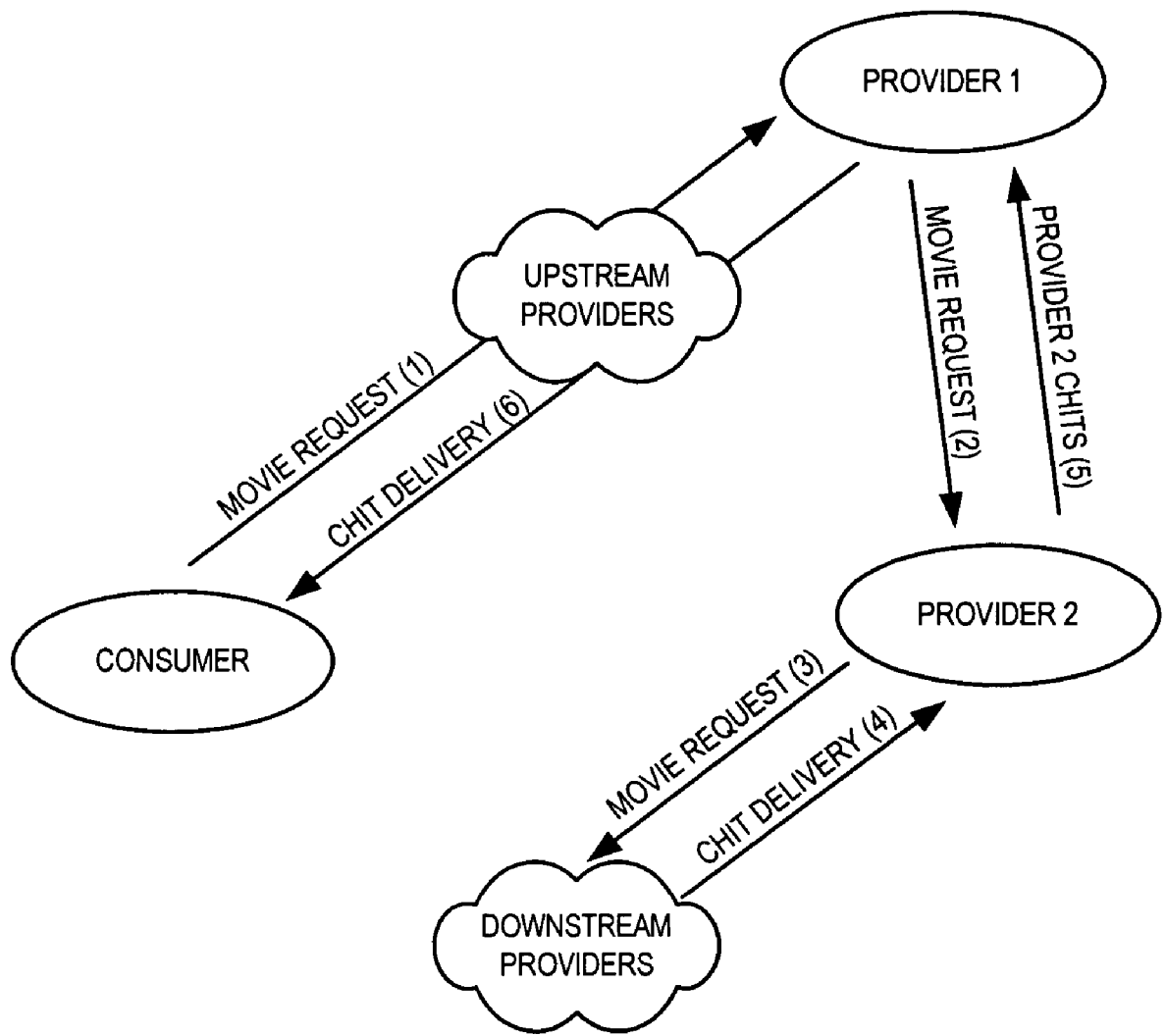
FIG. 11 is an exemplary illustration of a content request.
Figure 12:
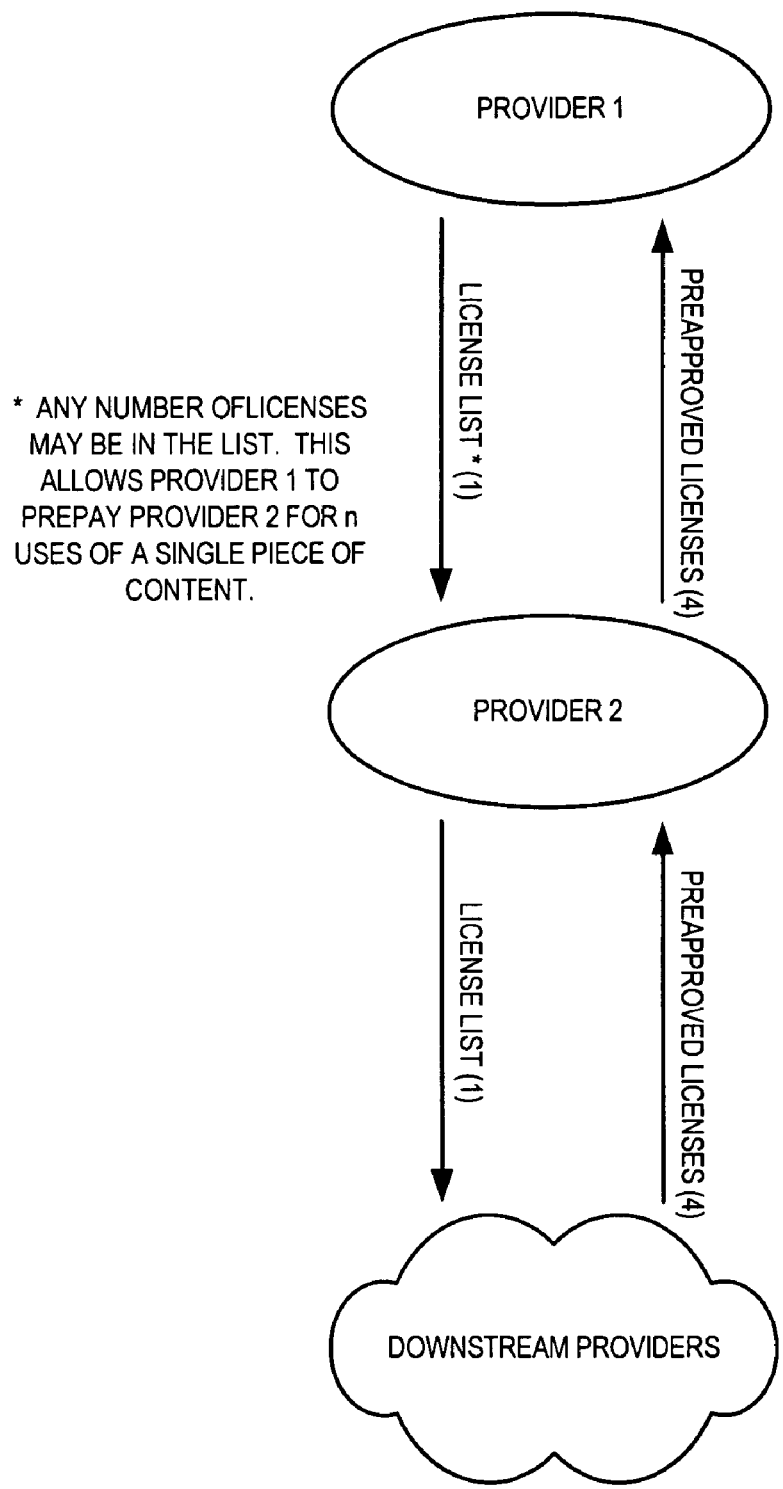
FIG. 12 is an exemplary illustration of a content request showing an approval phase.
Figure 13:
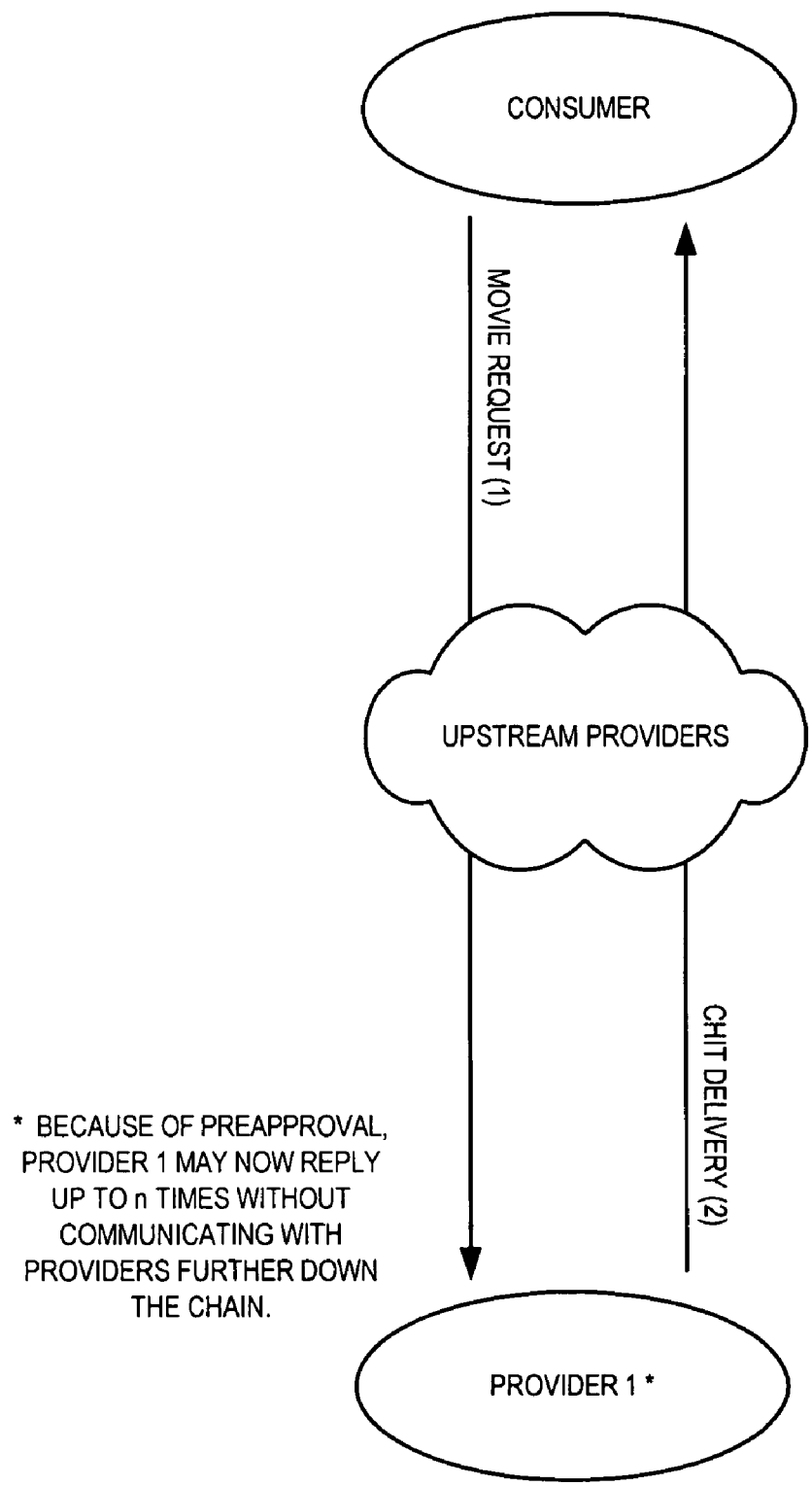
FIG. 13 is an exemplary illustration of a content request showing a delivery phase.

FIGS. 11-13 illustrate ways in which service and content providers can share content, if desired. One way of sharing content is for each content provider to hold the rights to certain content to create a license upon receiving a request for the desired content (FIG. 11). Alternatively, content providers may distribute a predetermined number of licenses to downstream providers so that they do not have to respond to each request on an individual basis and so that downstream providers can be assured of having the ability to distribute a certain number of "copies" of certain content, without having to obtain approval, which could possibly be denied, by the act of refusing to supply a license, for each individual request that the downstream provider receives from end consumers (FIGS. 12 and 13).

Figure 14:
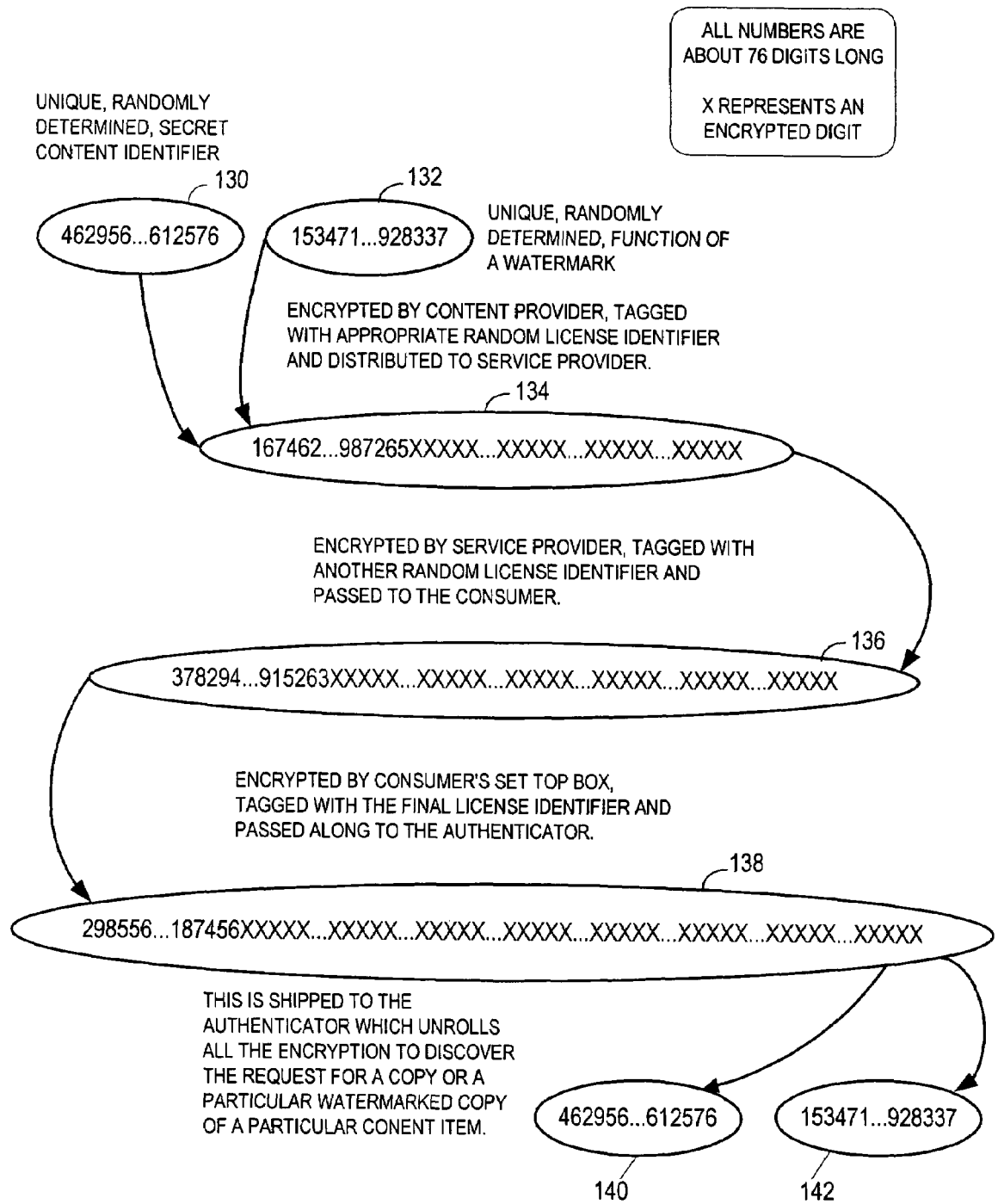
FIG. 14 is a schematic illustration of a license structure for another exemplary embodiment of the invention where watermarking is used.

FIG. 14 illustrates the process of generating and utilizing a license for content, where the content is watermarked. As noted above, a license for content undergoes multiple transformations, in the sense that the license is encrypted multiple times. The content provider 22 creates the license upon receiving a request for particular content or in preparation of future requests by the consumer 26. The license is an encrypted version of the randomly determined, secret identifier 130 that the content provider created for the subject content and a function of the watermark 132 applied to the copy of the content. The now once encrypted version of the license (license 134 in FIG. 14) is sent to the service provider 24. The service provider 24 encrypts the license again (license 136 in FIG. 14) and the now doubly encrypted version is sent to the consumer 26. The doubly encrypted license is encrypted with the mutating ID of the consumer to create a thrice-encrypted version (license 138 in FIG. 14). Authentication or verification of the license and ultimately delivery and decoding of information is then performed as noted in the discussion above with respect to FIG. 5 except the encrypted content and decoding information is specific to the watermarked content identified in the license. FIG. 15 provides another illustration of the process, including the multiple encryption steps.

Figure 16:
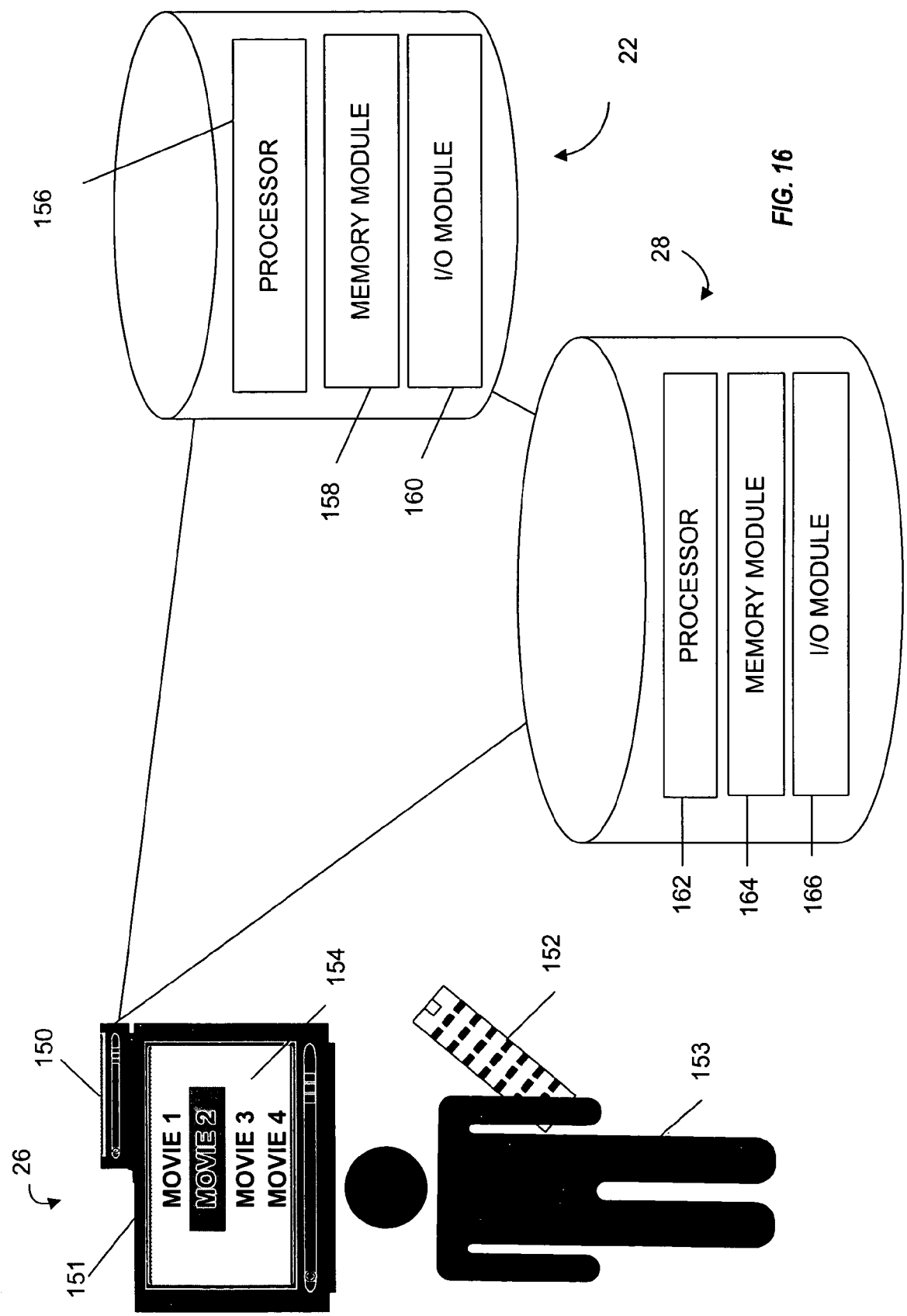
FIG. 16 is a schematic illustration of exemplary embodiments of the devices used to distribute content where three entities are involved in a communication.

FIG. 16 illustrates exemplary embodiments of the devices used to distribute content. The consumer 26 is illustrated as a set top device 150. The set top device 150 is coupled to a display capable of displaying content 151, and provides an interface to the set top device through a remote control 152. A user 153 uses the remote control 152 to interact with the set top device 150. The user 153 uses the remote control 152 to view a list of available content and select content to view on the display 151. The interface accessed through the use of the remote control 152 also indicates when the user 153 makes a selection of content by highlighting or flashing the name of the selected content on the display 151.

Once the user 153 has selected content, the set top device 150 generates a request for the selected content. The request is then sent to the content provider 22. The content provider 22 device is illustrated as a server that contains a processor 156, a memory module 158, and input/output module 160. The memory module 158 contains the content items of the content provider 22 and at least one mutating identifier. The memory module 158 may contain other mutating identifiers if the content provider 22 has requested numerous mutating identifiers from the authenticator 28. The memory module 158 may contain non-volatile memory such as one or more forms of ROM, one or more disk drives, RAM, other memory, or combinations of the foregoing.

The content provider 22 receives the request through the input/output module 160 and transfers the request to the processor 156. The processor 156 accesses the memory module 158 to obtain a mutating identifier that it will use to encrypt a license for the content item also stored in the memory module 158. The processor 156 encrypts the license and transfers the license to the consumer 26 through the input/output module 160.

The consumer 26 receives the encrypted license, processes the encrypted licenses (as will be explained below), and forwards the encrypted license to the authenticator 28. The authenticator is also illustrated as a server containing a processor 162, a memory module 164, and an input/output module 166. Unlike the memory module 158 of the content provider 22, the memory module 164 of the authenticator 28 does not contain content to be distributed. Again, the memory module 162 may contain non-volatile memory such as one or more forms of ROM, one or more disk drives, RAM, other memory, or combinations of the foregoing.

The processor 162 of the authenticator 28 decrypts the received encrypted license received by the input/output module 166 to uncover the content requested and the entities involved in the distribution. Once the identities of the participating entities are known, the processor 162 verifies the identities of the participating entities and generates a receipt for the content provider 22. The processor also accesses the decryption key associated with the content specified in the license and accesses one or more new mutating identifiers from the memory module 164. The processor then directs the receipt, the one or more new mutating identifiers, and the decryption key to be sent to the respective parties by the input/output module 166. The processor 162 of the authenticator also indicates in the memory module 164 that the mutating identifiers used in the current transaction have been used and should be accepted if encountered in the future.

The consumer 26 receives the decryption key and a new mutating identifier, and the content provider 22 receives the receipt for the requested content item and a new mutating identifier if required. The content provider 22 then sends the encrypted content to the consumer 26 and can record that the consumer 26 received the content.

Once the consumer 26 receives the encrypted content from the content provider, it now has everything it needs to watch the movie. The set top device 150 can now display the movie on the connected display 151.

Figure 17:
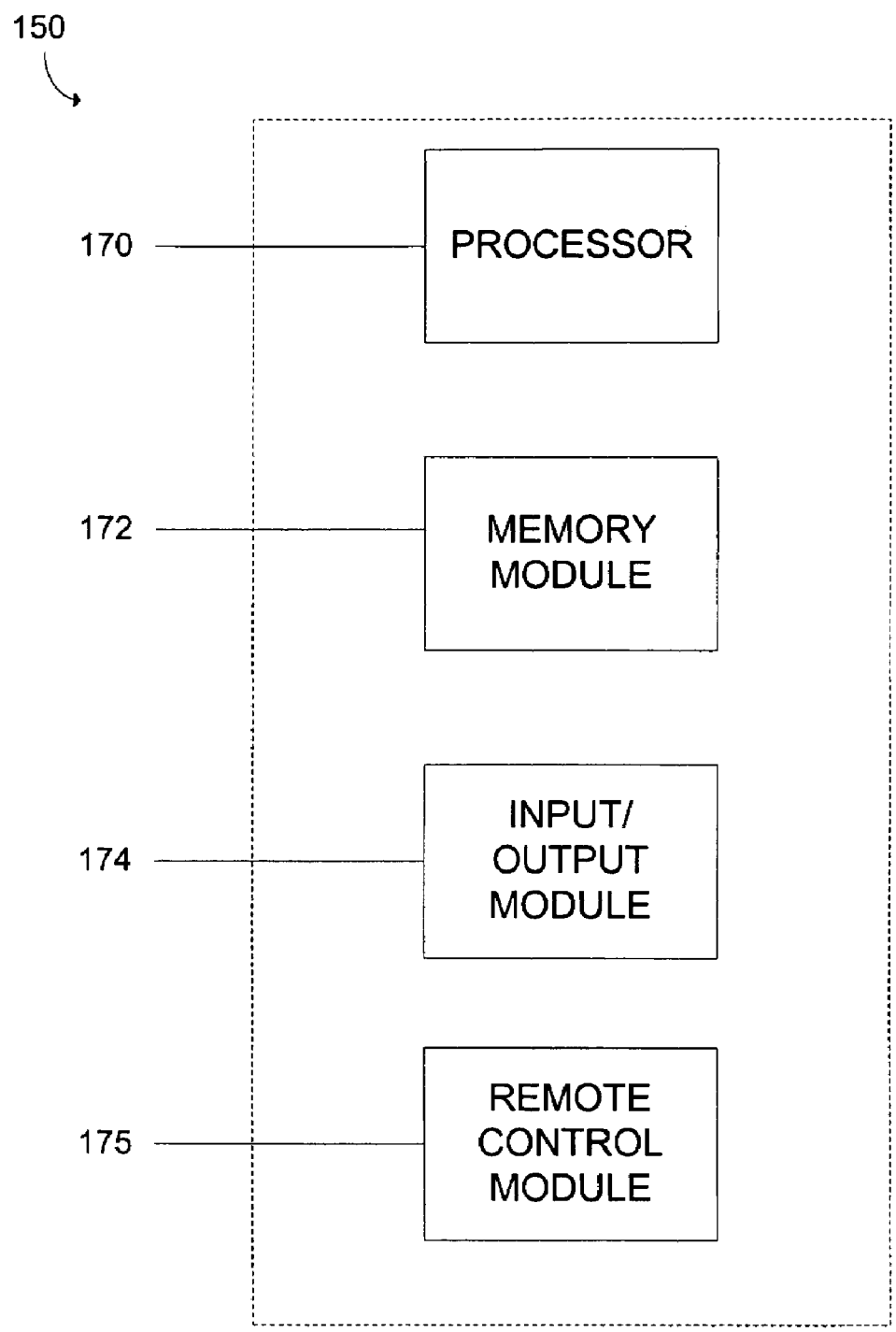
FIG. 17 is a schematic diagram of hardware inside one of the peripherals shown in FIG. 16.

FIG. 17 illustrates hardware that may be used in the set top device 150. In the exemplary configuration shown, the set top device 150 includes a processor 170, a memory module 172, an input/output module 174, and a remote control module 175. The hardware may contain other modules as well.

The memory module 172 is used to hold the mutating identifier of the consumer 26 and may also be used to hold content, messages, or keys sent by the content provider 22 and/or authenticator 28. The memory module 172 may contain non-volatile memory such as one or more forms of ROM, one or more disk drives, RAM, other memory, or combinations of the foregoing.

The processor 170 is configured to generate requests, encrypt received messages, access and store data to the memory module 172, and decrypt received content. The input/output module 174 is configured to interface with the other entities of the system (i.e., the content provider 22 and authenticator 28), and the display device 151. The remote control module 175 is configured to interface with the remote control 152 used by the user 153 to initiate requests for content.

Although a processor is paired with a memory and an input/output module is illustrated for all three devices used in the distribution system, it should be apparent to one skilled in the art that hardware, software, or any combination thereof could be used to communicate and distribute content between participating entities. The processor could be an integrated circuit, a microprocessor, or any combination of hardware and software that can perform the necessary operations for distributing content.

As should be apparent, the system 20 and the protocol used to implement it can be used in a variety of applications beyond the secure distribution of content. Many different types of communications ranging from e-mail, video and multi-media conferencing, data and telemetry collection, and others may benefit from using all or part of the system 20 to enhance security and trust. Some of these additional applications are now discussed.

Confirmation of Geographic Location

As is known, innumerous human activities depend on the human participants trusting the other participants. Furthermore, participants must feel comfortable that the other participants are authentic (i.e., not imposters or frauds) and will not renege on promises or commitments made. In times when most activities took place face-to-face many concerns about authenticity were reduced. For example, before the existence of the telephone and Internet, imposters would have to physically meet and fool any person that the imposter intended to dupe. With modem communications, it is often impossible for parties to know who they are actually communicating with or where the parties are located.

Various biometric and other devices exist that can be used to address concerns of authenticity and trust and many of these can be used with or added into embodiments of the system 20 described. However, the system 20 also has inherent features that lessen concerns of authenticity. One of these is the ability to trace, at least to a relatively specific point, the location of customers ordering content.

As noted, mutating IDs are implemented in embodiments of the invention and the consumer 26 is assigned the first mutating ID 100. Subsequent mutating IDs are assigned each time the consumer desires to obtain content. Further, each customer 26 has a decoding processor or similar device (e.g., a set top box, home computer, etc.) and the customer's address and name are associated with that hardware. Each service provider and content provider also has an actual physical location and address. Because embodiments of the system 20 rely on unraveling multi-encrypted and encapsulated identifiers, the location of a consumer can, at a minimum, be traced to the service area of the service provider of the consumer.

For example, if the customer or a thief moved the customer's hardware to a location outside of the service area of the service provider 24 and requested content, the unraveling of the multi-encrypted and encapsulated identifiers would fail, as the new service provider would be unable to send appropriate keys needed for decoding based on the mutating ID stored in the hardware.

Real Time Authentication of User and Real Time Play Back of Content.

As noted, one difficulty with modern communications systems is ensuring the authenticity of the communicating parties. In one embodiment of the invention, the system 20 may be used to encode information such as email messages sent from one party to another. The sending party acts like the content provider/service provider and the receiving party like the customer.

One way to provide extra insurance of authenticity is to send a receiving party certain random information and require that the recipient process that information and relay it back to the sender before communication of valuable information begins. For example, randomly selected sections of text from the U.S. Constitution, the Gettysburg Address, or for that matter any text from the thousands of manuscripts from the Library of Congress may be sent to the receiving party. Before any valuable content or information is sent to the receiving party, the randomly selected text must be properly decrypted and then a duplicate of the information sent back to the recipient. If the receiving party is unable to do this, then an improper communication connection has been made or the receiving party is an imposter, who may, for example, have intercepted or hacked into the communication link of the true recipient. However, without possessing the proper mutating ID, no decryption of the random text is possible.

An additional security feature that may be added to the system 20 is real-time play back of content. As noted earlier, one of the problems for copyright and other legal rights holders, is that digital content can be copied (at least theoretically) an infinite number of times and the time needed to make each copy is very short. For example, a CD containing seventy minutes of music can be completely copied in a few minutes. Compressed files may be copied even faster. This makes large-scale illicit copying of content very attractive to a potential criminal. Once a single copy of valuable content is obtained, hundreds and possibly thousands of pristine copies can be made quickly and then sold.

In embodiments of the system 20, decoding of the content at the consumer 26 or receiver is done in a real-time fashion, meaning that play back in the system 20 occurs no faster than playback of the content as intended for the final viewer or consumer. Thus, if a movie has a running time of 2 hours and twenty minutes, recording of the content sent to the consumer takes the same amount of time, thereby discouraging large scale copying of the same. It should also be noted that the system is configured to restrict the number of decryptions that occur. Generally, only one decryption can be made by the customer. This helps reduce unauthorized copying. It should also be noted that the content may include known copy protection devices or code before it is encrypted. These devices may be used to prevent or reduce unauthorized copying as well.

Data and Telemetry Collection

As noted, embodiments of the invention may be implemented where just three parties participate. The parties include an authenticator, a sending party (by analogy encompassing the roles and functions of the content provider and service provider), and receiving party (by analogy encompassing the roles and functions of the consumer). As noted, the system 20 may be configured to implement a secure email system. As should be apparent, the system 20 could also be implemented in a variety of other applications where secure communication could be useful, such as collecting data from electric and gas meters, equipment and human monitoring systems, and other data and telemetry collection applications. In general, many existing systems could be readily modified with existing processing and communications hardware to allow communications using the multi-encrypted and encapsulated identifier architecture described herein.

As can be seen from the above, various embodiments provide a system and method of distributing content and information with features to protect security and the legal rights of content owners. Additional features and advantages of the invention are set forth in the attached claims. And, additional embodiments of the invention could be implemented as would be apparent to those of ordinary skill in the art by considering the discussion herein and information provided in the drawings.

The invention claimed is:

1. A method of distributing content items, the method comprising:
   obtaining encrypted content at a first entity, the encrypted content including a content item encrypted with a first encryption key;
   requesting, at the first entity, a first mutating identifier having a first part and a first key from an authenticator;
   encrypting, at the first entity, a watermark with the first key from the first mutating identifier to create a first encrypted label;
   grouping, at the first entity, the first part of the first mutating identifier with the first encrypted label to create a first encrypted watermark;
   receiving, at the first entity, a request for a content item from a second entity having an identity and a second mutating identifier over a communication link;
   generating a decryption key request at the first entity;
   transferring the decryption key request from the first entity to the authenticator over a communication link;
   receiving, at the first entity, the first decryption key and a second encryption key from the authenticator over a communication link;
   decrypting, at the first entity, the encrypted content with the first decryption key to obtain the content item;
   applying, at the first entity, the watermark to the content item to obtain watermarked content;
   encrypting, at the first entity, the watermarked content with the second encryption key to create encrypted watermarked content;
   transferring the first encrypted watermark from the first entity to the second entity over a communication link;
   verifying, at the authenticator, the identity of the second entity;
   based on verifying the identity of the second entity, sending the encrypted watermarked content from the first entity to the second entity over a communication link; and
   based on verifying the identity of the second entity, sending a second decryption key from the authenticator to the second entity over a communication link.

2. The method claimed in claim 1, further comprising generating a plurality of watermarks including the watermark, wherein each watermark is distinct.

3. The method claimed in claim 1, wherein the first encryption key is associated with a known identifier associated with the content item.

4. The method claimed in claim 1, wherein the second decryption key is the second encryption key used to encrypt the watermarked content.

5. The method claimed in claim 1, wherein the first encrypted watermark is only transferred to the second entity.

6. The method claimed in claim 1, wherein verifying the identity of the second entity comprises:
encrypting, at the second entity, the first encrypted watermark with a key included in the second mutating identifier of the second entity to create a doubly-encrypted watermark;
sending the doubly-encrypted watermark from the second entity to the authenticator;
decrypting, at the authenticator, the doubly-encrypted watermark to uncover the first encrypted watermark;
decrypting, at the authenticator, the first encrypted watermark to uncover the watermark; and
generating, at the authenticator, a receipt for the first entity.

7. The method claimed in claim 6, wherein the receipt for the first entity contains a concatenation of the identity of the second entity and the first encrypted watermark.

8. The method claimed in claim 6, further comprising encrypting, at the authenticator, the receipt for the first entity with a mutating identifier known to the first entity.

9. The method claimed in claim 6, further comprising sending the second entity a third mutating identifier from the authenticator.

10. The method claimed in claim 9, further comprising marking, at the authenticator, the second mutating identifier as used.

11. The method claimed in claim 1, further comprising generating, at the authenticator a receipt for a third entity.

12. The method claimed in claim 11, wherein the receipt for the third entity contains a concatenation of the identity of the second entity and a function of the watermark.

13. The method claimed in claim 11, further comprising encrypting the receipt for the third entity with a mutating identifier known to the third entity.

14. The method claimed in claim 1, further comprising marking, at the authenticator, the first mutating identifier as used.

15. The method claimed in claim 1, further comprising requesting authorization of the second decryption key from the second entity based on a known identifier associated with the second decryption key before sending the second decryption key to the second entity.

16. The method claimed in claim 1, further comprising assigning, at a third entity, a label to the content item.

17. The method claimed in claim 16, further comprising generating a key request for the first encryption key at the third entity, the key request including the label.

18. The method claimed in claim 17, further comprising transferring the key request from the third entity to the authenticator.

19. The method claimed in claim 18, further comprising receiving, at the third entity, the first encryption key from the authenticator.

20. The method claimed in claim 19, further comprising encrypting, at the third entity, the content item with the first encryption key to create the encrypted content.

21. The method claimed in claim 20, further comprising transferring the encrypted content to the first entity over a communication link.

22. A method of distributing content, the method comprising:
obtaining encrypted content at a first entity, the encrypted content including a content item encrypted with a first encryption key;
obtaining a first encrypted watermark at the first entity, the first encrypted watermark including a watermark encrypted with a first key of a first mutating identifier;
requesting from the authenticator, at the first entity, a second mutating identifier having a second part and a second key;
encrypting, at the first entity, the first encrypted watermark with the second key from the second mutating identifier to create a second encrypted watermark;
grouping, at the first entity, the second part of the second mutating identifier with the second encrypted watermark to create a first doubly-encrypted watermark;
receiving, at the first entity, a request for a content item from a second entity having an identity and a third mutating identifier over a communication link;
generating a decryption key request at the first entity;
transferring the decryption key request from the first entity to the authenticator over a communication link;
receiving, at the first entity, the watermark, a first decryption key, and a second encryption key from the authenticator over a communication link;
decrypting, at the first entity, the encrypted content with the first decryption key to obtain the content item;
applying, at the first entity, the watermark to the content item to create watermarked content;
encrypting, at the first entity, the watermarked content with the second encryption key to create encrypted watermarked content;
transferring the first doubly-encrypted watermark to the second entity from the first entity over a communication link;
verifying, at the authenticator, the identity of the second entity;
based on verifying the identity of the second entity, sending the encrypted watermarked content from the first entity to the second entity a communication link; and
based on verifying the identity of the second entity, sending a second decryption key from the authenticator to the second entity over a communication link.

23. The method claimed in claim 22, further comprising generating a plurality watermarks including the watermark, wherein each watermark is distinct.

24. The method claimed in claim 22, wherein the first encryption key is associated with a known identifier, the known identifier included in the request.

25. The method claimed in claim 22, wherein the second decryption key is the second encryption key used to encrypt the watermarked content.

26. The method claimed in claim 22, wherein the first doubly-encrypted watermark is only transferred to the second entity.

27. The method claimed in claim 22, wherein verifying the identity of the second entity comprises:
encrypting, at the second entity, the first doubly-encrypted watermark with a key included in the third mutating identifier of the second entity to create a thrice-encrypted watermark;
sending the thrice-encrypted watermark to the authenticator from the second entity;
decrypting, at the authenticator, the thrice-encrypted watermark to uncover the first doubly-encrypted watermark;
decrypting, at the authenticator, the first doubly-encrypted watermark to uncover the encrypted watermark;
decrypting, at the authenticator, the encrypted watermark to uncover the watermark; and generating, at the authenticator, a receipt for the first entity.

28. The method claimed in claim 27, wherein the receipt for the first entity contains a concatenation of the identity of the second entity and the encrypted watermark.

29. The method claimed in claim 27, further comprising encrypting, at the authenticator, the receipt with a mutating identifier known to the first entity.

30. The method claimed in claim 22, further comprising sending the second entity a fourth mutating identifier from the authenticator.

31. The method claimed in claim 30, further comprising marking, at the authenticator, the third mutating identifier as used.

32. The method claimed in claim 22, further comprising marking, at the authenticator, the first and second mutating identifiers as used.

33. The method claimed in claim 22, further comprising generating, at the authenticator, a receipt for a third entity.

34. The method claimed in claim 33, wherein the receipt for the third entity contains a concatenation of the identity of the second entity and a function of the watermark.

35. The method claimed in claim 33, further comprising encrypting, at the authenticator, the receipt for the third entity with a mutating identifier known to the third entity.

36. The method claimed in claim 22, further comprising requesting, at the authenticator, authorization of the second decryption key from the second entity based on a known identifier associated with the second decryption key before sending the second decryption key to the second entity.

37. The method claimed in claim 22, further comprising assigning, at a third entity, a label to the content item.

38. The method claimed in claim 37, further comprising generating a key request for the first encryption key at the third entity, the key request including the label.

39. The method claimed in claim 38, further comprising transferring the key request from the third entity to the authenticator.

40. The method claimed in claim 39, further comprising receiving, at the third entity, the first encryption key from the authenticator.

41. The method claimed in claim 40, further comprising encrypting the content item with the first encryption key to create the encrypted content.

42. The method claimed in claim 41, further comprising transferring the encrypted content to the first entity over a communication link.

43. The method claimed in claim 42, further comprising generating, at the third entity, the watermark.

44. The method claimed in claim 43, further comprising requesting, at the third entity, the first mutating identifier from the authenticator, the first mutating identifier including a first part and a first key.

45. The method claimed in claim 44, further comprising receiving, at the third entity, the first mutating identifier from the authenticator.

46. The method claimed in claim 45, further comprising encrypting, at the third entity, the label and the watermark with the first key of the first mutating identifier to create a first encrypted watermark.

47. The method claimed in claim 46, further comprising grouping the first part of the first mutating identifier with the first encrypted label to create the first encrypted watermark.

48. The method claimed in claim 47, further comprising transferring the first encrypted watermark to the first entity over a communication link.

* * * * *